United States Patent
Oi et al.

(10) Patent No.: US 11,668,369 B2
(45) Date of Patent: Jun. 6, 2023

(54) VIBRATION DAMPING DEVICE AND DESIGN METHOD OF THE SAME

(71) Applicant: AISIN CORPORATION, Kariya (JP)

(72) Inventors: Yoichi Oi, Ama (JP); Takao Sakamoto, Anjo (JP); Takuya Fukuoka, Anjo (JP)

(73) Assignee: AISIN CORPORATION, Kariya (JP)

( * ) Notice: Subject to any disclaimer, the term of this patent is extended or adjusted under 35 U.S.C. 154(b) by 280 days.

(21) Appl. No.: 17/273,451

(22) PCT Filed: Nov. 18, 2019

(86) PCT No.: PCT/JP2019/045101
§ 371 (c)(1),
(2) Date: Mar. 4, 2021

(87) PCT Pub. No.: WO2020/105588
PCT Pub. Date: May 28, 2020

(65) Prior Publication Data
US 2021/0246965 A1 Aug. 12, 2021

(30) Foreign Application Priority Data
Nov. 20, 2018 (JP) .............................. JP2018-217320

(51) Int. Cl.
F16F 15/14 (2006.01)
F16F 15/31 (2006.01)
F16H 45/02 (2006.01)

(52) U.S. Cl.
CPC ............ F16F 15/145 (2013.01); F16F 15/31 (2013.01); *F16F 2222/08* (2013.01);
(Continued)

(58) Field of Classification Search
CPC ...... F16F 15/14; F16F 15/1407; F16F 15/145; F16F 15/31; F16F 2222/08; F16F 2230/00; F16F 2232/02; F16D 3/12
See application file for complete search history.

(56) References Cited

U.S. PATENT DOCUMENTS 10,508,708 B1 * 12/2019 Tomiyama .............. F16H 45/02
10,508,709 B2    12/2019 Oi et al.
(Continued)

FOREIGN PATENT DOCUMENTS

JP       2018-54038 A       4/2018
WO     2018/199323 A1      11/2018
(Continued)

OTHER PUBLICATIONS

Machine Translation of WO 2019/035407.*
(Continued)

*Primary Examiner* — Brian J McGovern
(74) *Attorney, Agent, or Firm* — Sughrue Mion, PLLC

(57) ABSTRACT

A vibration damping device including a supporting member rotating with a rotation element around a rotation center of the rotation element; a restoring force generation member coupled to the supporting member to transfer torque to and from the supporting member and configured to swing with rotation of the supporting member; and an inertia mass body coupled to the supporting member via the restoring force generation member and swinging around the rotation center with the restoring force generation member with rotation of the supporting member, in which the restoring force generation member swings around a swing center so that a relative position with respect to the inertia mass body does not change, and a distance between a center of gravity of the restoring force generation member and the swing center changes with a change in a swing angle of the restoring force generation member with respect to the inertia mass body.

18 Claims, 18 Drawing Sheets

(52) U.S. Cl.
CPC ..... *F16F 2228/001* (2013.01); *F16F 2232/02* (2013.01); *F16H 45/02* (2013.01); *F16H 2045/0226* (2013.01); *F16H 2045/0263* (2013.01)

(56) References Cited

U.S. PATENT DOCUMENTS

| | | | | |
|---|---|---|---|---|
| 2002/0078791 | A1* | 6/2002 | Eckel | F16F 15/145 |
| | | | | 74/574.4 |
| 2010/0242466 | A1* | 9/2010 | Krause | F16F 15/167 |
| | | | | 60/338 |
| 2012/0255394 | A1* | 10/2012 | Maienschein | F16F 15/145 |
| | | | | 74/574.2 |
| 2013/0239746 | A1* | 9/2013 | Movlazada | F16F 15/145 |
| | | | | 74/574.2 |
| 2014/0174869 | A1* | 6/2014 | Takikawa | F16F 15/145 |
| | | | | 188/378 |
| 2015/0167779 | A1 | 6/2015 | Ulbrich et al. | |
| 2015/0292594 | A1* | 10/2015 | Nishii | F16F 15/145 |
| | | | | 74/574.2 |
| 2016/0131220 | A1* | 5/2016 | Siemens | F16F 15/145 |
| | | | | 188/378 |
| 2017/0234401 | A1* | 8/2017 | Horita | F16F 15/145 |
| | | | | 74/572.21 |
| 2018/0313427 | A1* | 11/2018 | Siemens | F16F 15/145 |
| 2019/0048972 | A1* | 2/2019 | Iwagaki | F16F 15/1457 |
| 2019/0170212 | A1* | 6/2019 | Ishibashi | F16F 15/1457 |
| 2019/0178333 | A1* | 6/2019 | Nasu | F16F 15/145 |
| 2019/0178334 | A1* | 6/2019 | Nasu | F16F 15/13185 |
| 2019/0186593 | A1* | 6/2019 | Kawahara | F16F 15/31 |
| 2019/0285136 | A1* | 9/2019 | Ishibashi | F16F 15/3156 |
| 2020/0032875 | A1* | 1/2020 | Oi | F16F 15/145 |
| 2020/0088264 | A1* | 3/2020 | Nakamura | F16F 15/1216 |
| 2020/0240497 | A1* | 7/2020 | Ito | F16F 15/145 |
| 2020/0271189 | A1* | 8/2020 | Tomita | F16F 15/14 |
| 2020/0378489 | A1* | 12/2020 | Oi | F16F 15/145 |
| 2021/0156453 | A1* | 5/2021 | Nakamura | F16F 15/002 |
| 2022/0120331 | A1* | 4/2022 | Ryoo | F16F 15/1457 |

FOREIGN PATENT DOCUMENTS

| | | | | |
|---|---|---|---|---|
| WO | 2018/199325 A1 | 11/2018 | | |
| WO | WO-2019035407 A1 | * | 2/2019 | ............ F16F 15/145 |

OTHER PUBLICATIONS

Machine Translation of WO 2018/199323.*
Machine Translation of WO 2018/199325.*
International Search Report for PCT/JP2019/045101 dated Jan. 28, 2020 (PCT/ISA/210).
European Search Report dated Oct. 1, 2021, issued by the European Patent Office in application No. 19887698.9.

* cited by examiner

US 11,668,369 B2

VIBRATION DAMPING DEVICE AND DESIGN METHOD OF THE SAME

CROSS REFERENCE TO RELATED APPLICATIONS

This application is a National Stage of International Application No. PCT/JP2019/045101 filed Nov. 18, 2019, which designates the United States, incorporated herein by reference, and which claims the benefit of priority from Japanese Patent Application No. 2018-217320 filed Nov. 20, 2018, the entire contents of which are incorporated herein by reference.

TECHNICAL FIELD

The present disclosure is relates to a vibration damping device and a design method thereof. Here, the vibration damping device includes a restoring force generation member that can swing with the rotation of a supporting member, and an inertia mass body that is coupled to the supporting member via the restoring force generation member and that swings in association with the restoring force generation member with the rotation of the supporting member.

BACKGROUND ART

Conventionally, a vibration damping device including a supporting member, a plurality of weight bodies serving as restoring force generation members each rotatably connected to the supporting member via a coupling shaft, and one annular inertia mass body that is coupled to the supporting member and each weight body via the coupling shaft is known (see Patent Document 1, for example). In this vibration damping device, the weight body forms a sliding pair with the supporting member and the inertia mass body, and the supporting member and the inertia mass body form a rotating pair. As a result, the supporting member, the plurality of weight bodies, and the inertia mass body form a slider crank mechanism. Then, when the supporting member rotates, the weight body reciprocates (swings) in a radial direction with respect to the supporting member and swings (performs reciprocating rotary motion) with respect to the inertia mass body, and the inertia mass body swings (performs reciprocating rotary motion) around the rotation center of the supporting member in association with the swinging of the weight body. As a result, it is possible to apply vibration, which has a phase opposite to the vibration transmitted from an engine to the supporting member, from the swinging inertia mass body to the supporting member and dampen the vibration of the supporting member. Further, in the vibration damping device described in Patent Document 1, the sum of a distance L3 between the center of gravity of each weight body and the swing center of the weight body and a distance L4 between the swing center of the weight body and the rotation center (L3+L4) is constant. As a result, each weight body performs reciprocating rotary motion while keeping the distance L3 constant around the swing center that is set so that the relative position with respect to the inertia mass body does not change. Further, in Patent Document 1, it is described that when "J2" is the moment of inertia of the inertia mass body, "m" is the mass of the entire weight body (total value), and "k" is the rigidity (spring constant) of a system between the engine and the supporting member, an order (reference order) q of the vibration damping device is expressed by the following equation (1).

$$q=\sqrt{[[m \cdot L4 \cdot (L4+L3)2]/(J2 \cdot L3)]} \quad (1)$$

RELATED ART DOCUMENTS

Patent Documents

Patent Document 1: Japanese Unexamined Patent Application Publication (Translation of PCT Application) No. 2018-54038 (JP 2018-54038 A)

SUMMARY OF THE DISCLOSURE

Problem to be Solved by the Various Aspects of the Disclosure

Here, in the conventional vibration damping device described above, for example, when the moment of inertia J2 of the inertia mass body is increased in order to further improve the vibration damping performance, as can be seen from the above equation (1), there is a deviation in the order q of the vibration damping device, that is, the order of vibration that is satisfactorily damped by the vibration damping device. Thus, when the moment of inertia of the inertia mass body is increased, it is necessary to increase the mass of the weight body at the same time. However, the weight body is a member that receives centrifugal force, and it is not easy to increase the weight of the weight body from the viewpoint of space limitation and durability. Further, in the vibration damping device as described above, it is also necessary to ensure isochronism so that the deviation of the order of the vibration damping device is decreased as much as possible when a swing angle (amplitude) around the rotation center of the inertia mass body is increased.

Therefore, it is an aspect of the present disclosure to make it possible to satisfactorily dampen vibration of a target order while ensuring isochronism in a vibration damping device.

Means for Solving the Problem

A vibration damping device includes: a supporting member that rotates integrally with a rotation element, to which torque from an engine is transmitted, around a rotation center of the rotation element; a restoring force generation member that is coupled to the supporting member so as to transmit and receive torque to and from the supporting member and that is configured to swing in accordance with rotation of the supporting member; and an inertia mass body that is coupled to the supporting member via the restoring force generation member and that swings around the rotation center in conjunction with the restoring force generation member in accordance with rotation of the supporting member, in which the restoring force generation member swings around a swing center that is set so that a relative position with respect to the inertia mass body does not change, and a distance between a center of gravity of the restoring force generation member and the swing center changes in accordance with a change in a swing angle of the restoring force generation member with respect to the inertia mass body.

The vibration damping device of the present disclosure is configured so that the distance between the center of gravity of the restoring force generation member and the swing center, which is set so that the relative position with respect to the inertia mass body does not change, changes in accordance with the change in the swing angle of the restoring force generation member with respect to the inertia mass body. As a result, by increasing and decreasing the distance between the center of gravity of the restoring force generation member when the swing angle is zero and the swing center and by increasing and decreasing the moment of inertia of the inertia mass body in accordance with the increase and decrease of the distance, while suppressing the deviation of the order in accordance with the increase of the swing angle of restoring force generation member with respect to the inertia mass body, it is possible to match the order of the vibration damping device to the target order, and it is also possible to adjust the torque (inertia torque) applied to the supporting member from the inertia mass body. As a result, it is possible to satisfactorily dampen vibration of the target order while ensuring isochronism in the vibration damping device.

DESCRIPTION OF EMBODIMENTS

Next, embodiments for carrying out the various aspects of the present disclosure will be described with reference to the drawings.

Figure 1:
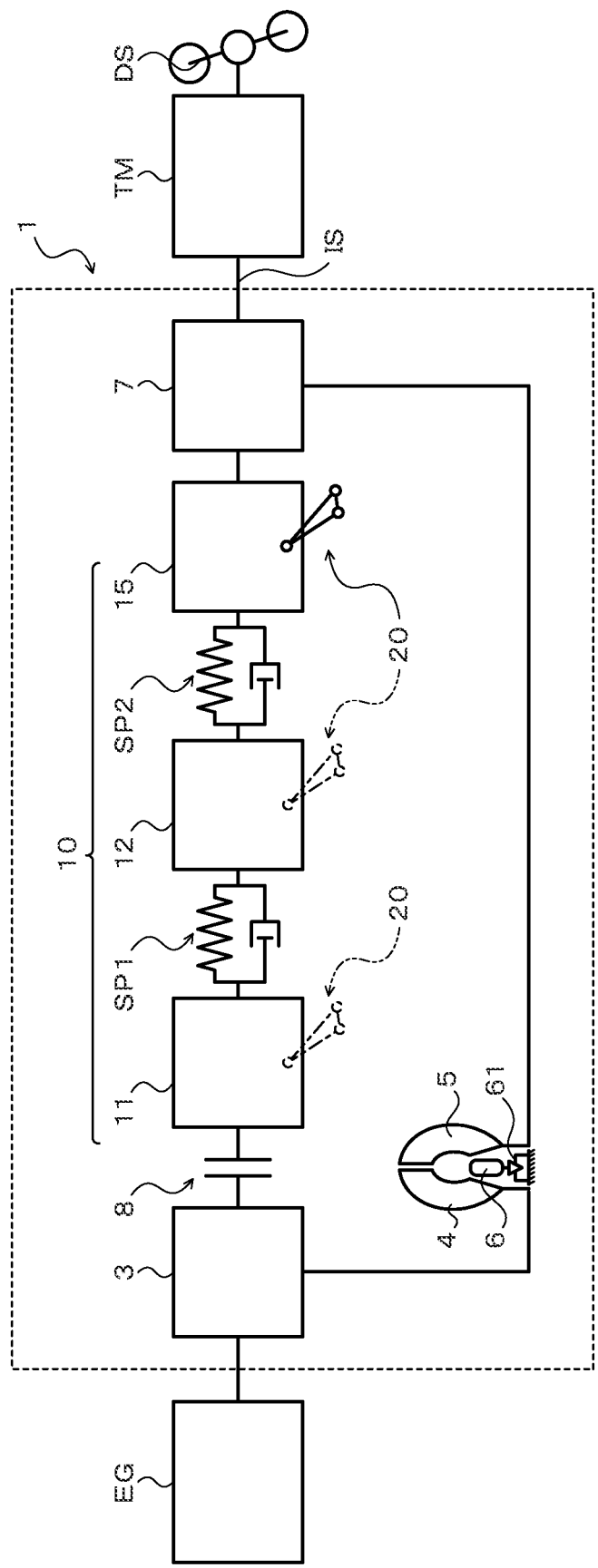
FIG. 1 is a schematic configuration diagram showing a starting device including a vibration damping device of the present disclosure.

FIG. 1 is a schematic configuration diagram showing a starting device 1 including a vibration damping device 20 of the present disclosure. The starting device 1 shown in the figure is mounted on a vehicle equipped with an engine (internal combustion engine) EG serving as a driving device, and is for transmitting power from the engine EG to a drive shaft DS of the vehicle, for example. In addition to the vibration damping device 20, the starting device 1 includes: a front cover 3 serving as an input member coupled to a crank shaft of the engine EG; a pump impeller (input side fluid transmission element) 4 that is fixed to the front cover 3 and that rotates integrally with the front cover 3; a turbine runner (output side fluid transmission element) 5 that can rotate coaxially with the pump impeller 4; a damper hub 7 serving as an output member fixed to an input shaft IS of a transmission (power transmission device) TM that is an automatic transmission (AT), a continuously variable transmission (CVT), a dual clutch transmission (DCT), a hybrid transmission or a deceleration device; a lockup clutch 8; and a damper device 10, and the like.

In the following description, unless otherwise specified, an "axial direction" basically indicates an extending direction of a central axis (axial center) of the starting device 1 and the damper device 10 (vibration damping device 20). Unless otherwise specified, a "radial direction" is basically indicates the radial direction of the starting device 1, the damper device 10, a rotation element of the damper device 10 and the like, that is, the linear extending direction that extends from the central axis of the starting device 1 and the damper device 10 in a direction (radial direction) orthogonal to the central axis. Further, unless otherwise specified, a "circumferential direction" basically indicates a circumferential direction of the starting device 1, the damper device 10, and the rotation element of the damper device 10, that is, a direction along a rotating direction of the rotation element.

Figure 2:
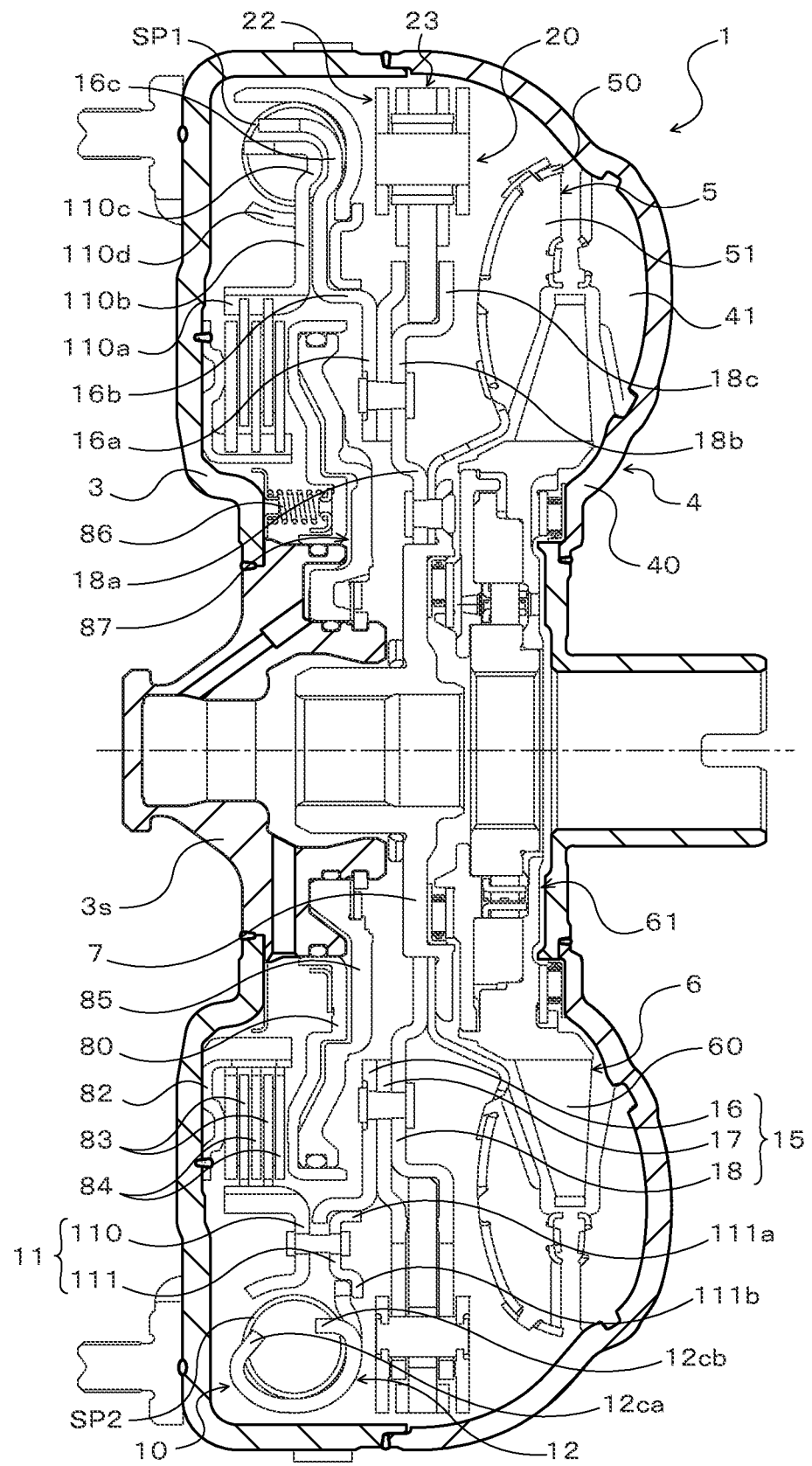
FIG. 2 is a cross-sectional view of the starting device shown in FIG. 1.

As shown in FIG. 2, the pump impeller 4 has a pump shell 40 tightly fixed to the front cover 3 and a plurality of pump blades 41 arranged on an inner surface of the pump shell 40. As shown in FIG. 2, the turbine runner 5 has a turbine shell 50 and a plurality of turbine blades 51 arranged on an inner surface of the turbine shell 50. An inner peripheral portion of the turbine shell 50 is fixed to the damper hub 7 via a plurality of rivets. The pump impeller 4 and the turbine runner 5 face each other, and a stator 6 for rectifying the flow of working oil (working fluid) from the turbine runner 5 to the pump impeller 4 is coaxially disposed therebetween. The stator 6 has a plurality of stator blades 60, and the rotation direction of the stator 6 is set to only one direction by a one-way clutch 61. The pump impeller 4, the turbine runner 5, and the stator 6 form a torus (annular flow path) for circulating working oil, and function as a torque converter (fluid transmission device) having a torque amplification function. However, in the starting device 1, the stator 6 and the one-way clutch 61 may be omitted, and the pump impeller 4 and the turbine runner 5 may function as a fluid coupling.

The lockup clutch 8 is configured as a hydraulic multi-plate clutch, and executes lockup of the front cover 3 and the damper hub 7, that is, the input shaft IS of the transmission TM, via the damper device 10 and also releases the lockup. The lockup clutch 8 includes: a lockup piston 80 that is supported so as to be movable in an axial direction by a center piece 3s fixed to the front cover 3; a clutch drum 110 included in a drive member 11 that is an input element of the damper device 10; an annular clutch hub 82 fixed to an inner surface of the front cover 3 so as to face the lockup piston 80; a plurality of first friction engagement plates (friction plates having a friction material on both surfaces) 83 fitted to splines formed on the clutch drum 110; and a plurality of second friction engagement plates (separator plates) 84 fitted to splines formed on an outer peripheral surface of the clutch hub 82.

Further, the lockup clutch 8 includes: an annular flange member (oil chamber defining member) 85 that is attached to the center piece 3s of the front cover 3 so as to be positioned on an opposite side of the front cover 3 with respect to the lockup piston 80 as a reference, that is, on the turbine runner 5 side of the lockup piston 80; and a plurality of return springs 86 disposed between the front cover 3 and the lockup piston 80. As shown in the figure, the lockup piston 80 and the flange member 85 define an engagement oil chamber 87, and working oil (engagement hydraulic pressure) is supplied from a hydraulic control device (not shown) to the engagement oil chamber 87. Then, by increasing the engagement hydraulic pressure to the engagement oil chamber 87, the lockup piston 80 can be moved in the axial direction so as to press the first and second friction engagement plates 83 and 84 toward the front cover 3 and thus, the lockup clutch 8 can be engaged (fully engaged or slip engaged). The lockup clutch 8 may be configured as a hydraulic single plate clutch.

As shown in FIGS. 1 and 2, the damper device 10 includes as rotation elements, a drive member (input element) 11 including the clutch drum 110, an intermediate member (intermediate element) 12, and a driven member (output element) 15 that is fixed to the damper hub 7 via a plurality of rivets along with the inner peripheral portion of the turbine shell 50. Further, the damper device 10 includes as torque transmitting elements, a plurality of (for example, three in the present embodiment) first springs (first elastic bodies) SP1 and second springs (second elastic bodies) SP2 arranged alternately on the same circumference at intervals in the circumferential direction. As the first and second springs SP1, SP2, an arc coil spring made of a metal material wound so as to have an axial center extending in an arc shape when no load is applied, or a straight coil spring made of a metal material wound in a spiral shape so as to have an axial center extending straight when no load is applied is adopted. Further, as the first and second springs SP1, SP2, so-called double springs may be adopted.

The drive member 11 of the damper device 10 includes the clutch drum 110 described above and an annular drive plate 111 coupled to the clutch drum 110 so as to rotate integrally with the clutch drum 110 via a plurality of rivets. The clutch drum 110 includes: a tubular drum portion 110a including a spline into which the plurality of first friction engagement plates 83 are fitted; an annular coupling portion 110b extending radially outward from one end of the drum portion 110a; a plurality of (for example, three at 120° intervals in the present embodiment) spring contact portions 110c that extends radially outward from the coupling portion 110b at intervals (at equal intervals) in the circumferential direction and that have claw portions in the axial direction; and a plurality of spring support portions 110d extending so as to be positioned radially outward of the drum portion 110a from the coupling portion 110b between each of the adjacent spring contact portions 110c in the circumferential direction. Further, the drive plate 111 has a short tubular inner peripheral portion 111a and a support portion 111b that is offset in the axial direction from the outer peripheral portion of the drive plate 111 and that extends radially outward. The drive plate 111 is fixed to the coupling portion 110b of the clutch drum 110 via a plurality of rivets so as to face the coupling portion 110b at an interval in the axial direction.

An intermediate member 12 is configured as an annular member that surrounds the first and second springs SP1, SP2 from the outside and that can (alternately) support the first and second springs SP1, SP2 together with the plurality of spring support portions 110d of the clutch drum 110 (drive member 11) while having the first and second springs SP1, SP2 adjacent to each other on the same circumference. Further, the intermediate member 12 includes a plurality of spring contact portions 12ca (for example, three at 120° intervals in the present embodiment) extending radially inward from the outer peripheral portion at intervals in the circumferential direction, and a plurality of (for example, three at 120° intervals in the present embodiment) spring contact portions 12cb extending from a side portion in the axial direction. As shown in FIG. 2, the inner peripheral portion of the intermediate member 12 is rotatably supported by an outer peripheral surface of the drive plate 111, and is supported in the axial direction by the support portion 111b.

As shown in FIG. 2, a driven member 15 includes an annular first driven plate 16, an annular second driven plate 17, and an annular third driven plate 18 that is coupled so as to rotate integrally with the first and second driven plates 16, 17 via a plurality of rivets and that is fixed to the damper hub 7 via the plurality of rivets. As shown, the second driven plate 17 is disposed closer to the front cover 3 than the first driven plate 16, and the third driven plate 18 is disposed closer to the turbine runner 5 than the second driven plate 17. Further, in the present embodiment, the thickness of the second and third driven plates 17, 18 are set to be the same as each other.

The first driven plate 16 includes an annular coupling portion 16a, a short cylindrical portion 16b extending axially from an outer circumference of the coupling portion 16a, and a plurality of (for example, three at 120° intervals in the present embodiment) spring contact portions 16c extended radially outward from an end portion of the cylindrical portion 16b and having a claw portion extending in the axial direction. The second driven plate 17 is an annular plate body, and an outer peripheral portion thereof is offset from an inner peripheral portion in the axial direction so as to be close to the third driven plate 18. The third driven plate 18 includes an annular coupling portion 18a that is coupled to the second driven plate 17 and the damper hub 7, a short cylindrical portion 18b that extends from an outer circumference of the coupling portion 18a in the axial direction so as to be spaced away from the second driven plate 17, and an annular portion 18c that is extended radially outward from an end portion of the cylindrical portion 18b and that faces the second driven plate 17 at an interval in the axial direction. As shown in FIG. 2, the cylindrical portion 16b of the first driven plate 16 rotatably supports the drive plate 111 of the drive member 11. As a result, the drive member 11 and the intermediate member 12 supported by the drive plate 111 are aligned with the damper hub 7 by the driven member 15.

In the mounted state of the damper device 10, the first and second springs SP1, SP2 are supported by a spring support portion 11d of the drive member 11 and the intermediate member 12 so as to be alternately arranged along the circumferential direction of the damper device 10, and one of each of the first and second springs SP1, SP2 is disposed between the spring contact portions 110c, which are adjacent to each other, of the drive member 11 (clutch drum 110). Thus, the first and second springs SP1, SP2 are arranged in an outer peripheral side region of the fluid chamber 9 so as to be positioned radially outward of the lockup clutch 8 (the lockup piston 80 and the first and second friction engagement plates 83, 84).

Further, each spring contact portion 12ca of the intermediate member 12 is in contact with end portions of the first and second springs SP1, SP2 that are disposed between the spring contact portions 110c adjacent to each other and that are paired (act in series), between the first and second springs SP1, SP2. Similarly, each spring contact portion 12cb of the intermediate member 12 is in contact with end portions of the first and second springs SP1, SP2 that are disposed between the spring contact portions 110c adjacent to each other and that are paired (act in series), between the first and second springs SP1, SP2. Thus, in the mounted state of the damper device 10, one end portion of each first spring SP1 is in contact with the corresponding spring contact portion 110c of the drive member 11, and the other end portion of each first spring SP1 is in contact with the corresponding spring contact portions 12ca, 12cb of the intermediate member 12. Further, in the mounted state of the damper device 10, one end portion of each second spring SP2 is in contact with the corresponding spring contact portions 12ca, 12cb of the intermediate member 12, and the other end portion of each second spring SP2 is in contact with the corresponding spring contact portion 110c of the drive member 11.

Each spring contact portion 16c of the driven member 15 (first driven plate 16) is interposed between the clutch drum 110 (spring contact portion 110c) and the drive plate 111, and in the mounted state of the damper device 10, similar to the spring contact portion 110c of the drive member 11, each spring contact portion 16c is in contact with the end portions of the first and second springs SP1, SP2, which do not form a pair (do not act in series), between the first and second springs SP1, SP2. Thus, in the mounted state of the damper device 10, the one end portion of each first spring SP1 is also in contact with the corresponding spring contact portion 16c of the driven member 15, and the other end portion of each second spring SP2 is also in contact with the corresponding spring contact portion 16c the driven member 15. As a result, the driven member 15 is coupled to the drive member 11 via the plurality of first springs SP1, the intermediate member 12, and the plurality of second springs SP2, and the first and second springs SP1, SP2 that are paired with each other are coupled in series via the spring contact portions 12ca, 12cb of the intermediate member 12, between the drive member 11 and the driven member 15. In the present embodiment, the distance between the axial center of the starting device 1 and the damper device 10 and the axial center of each first spring SP1 and the distance between the axial center of the starting device 1, etc. and the axial center of each second spring SP2 are the same.

Further, the damper device 10 of the present embodiment includes a first stopper that restricts the relative rotation of the drive member 11 and the intermediate member 12 and deflection of the first spring SP1, and a second stopper that restricts the relative rotation of the drive member 11 and the driven member 15 (both the first stopper and the second stopper are not shown). The first stopper is configured to restrict the relative rotation of the drive member 11 and the intermediate member 12 at the stage in which a torque transmitted from the engine EG to the drive member 11 reaches a predetermined torque (first threshold value) T1 that is smaller than a torque T2 (second threshold value) corresponding to a maximum torsion angle of the damper device 10. The second stopper is configured to restrict the relative rotation of the drive member 11 and the driven member 15 at the stage in which the torque transmitted to the drive plate 11 reaches the torque T2 corresponding to the maximum torsion angle. In this way, the damper device 10 has a two-step (two-stage) damping characteristic. The first stopper may be configured to restrict the relative rotation of the intermediate member 12 and the driven member 15 and deflection of the second spring SP2. Further, the damper device 10 may include a stopper that restricts the relative rotation of the drive member 11 and the intermediate member 12 and deflection of the first spring SP1, and a stopper that restricts the relative rotation of the intermediate member 12 and the driven member 15 and deflection of the second spring SP2.

The vibration damping device 20 is connected to the driven member 15 of the damper device 10 and is disposed inside the fluid chamber 9 filled with working oil. As shown in FIGS. 2 to 6, the vibration damping device 20 includes the second and third driven plates 17, 18 serving as supporting members (supporting plates), a plurality of (for example, three in the present embodiment) weight bodies 22 serving as restoring force generation members coupled to the second and third driven plates 17, 18 so as to transmit and receive torque to and from the second and third driven plates 17, 18, and one annular inertia mass body 23 that is coupled to each weight body 22.

Figure 3:
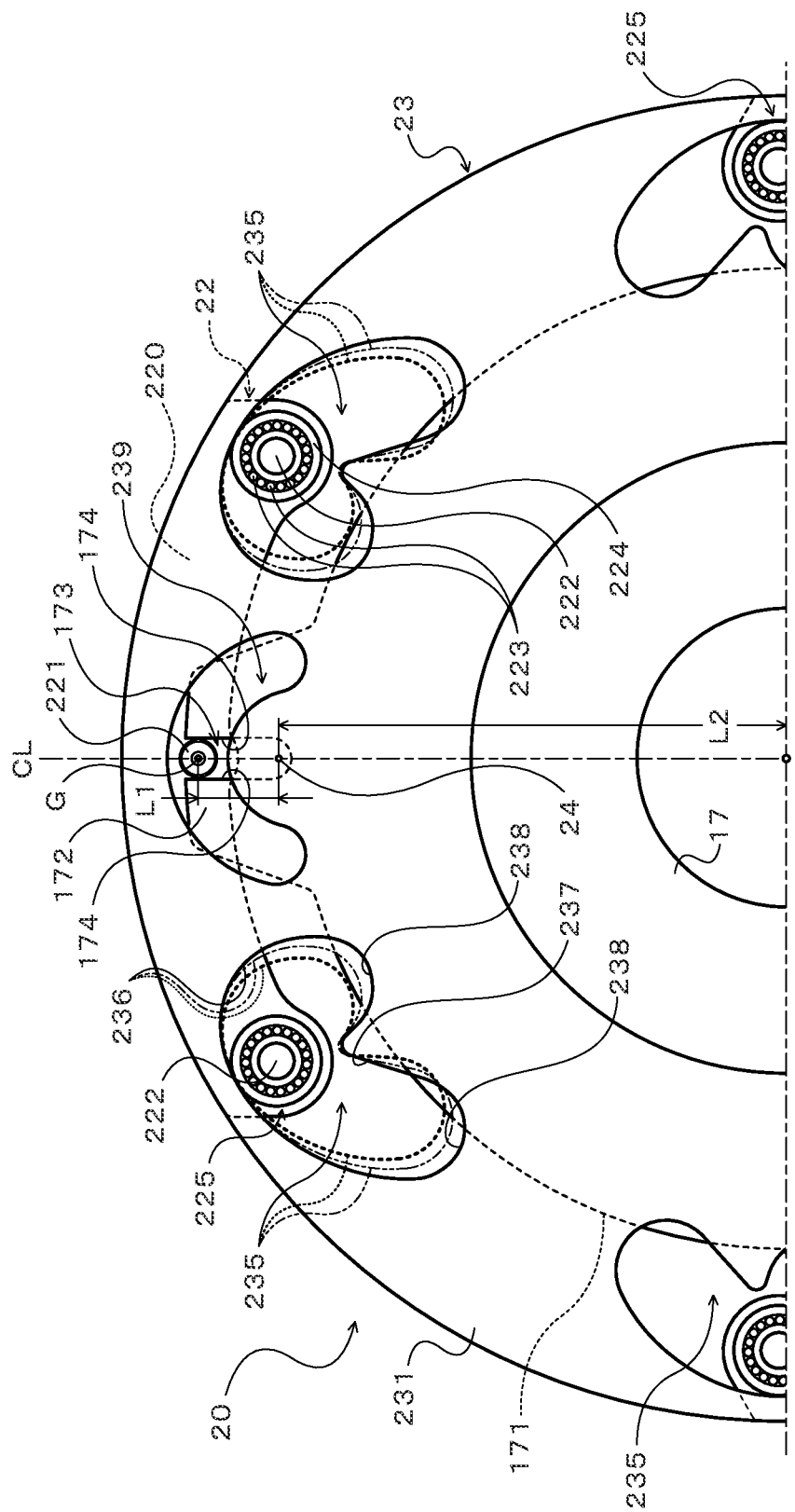
FIG. 3 is an enlarged view showing the vibration damping device of the present disclosure.
Figure 4:
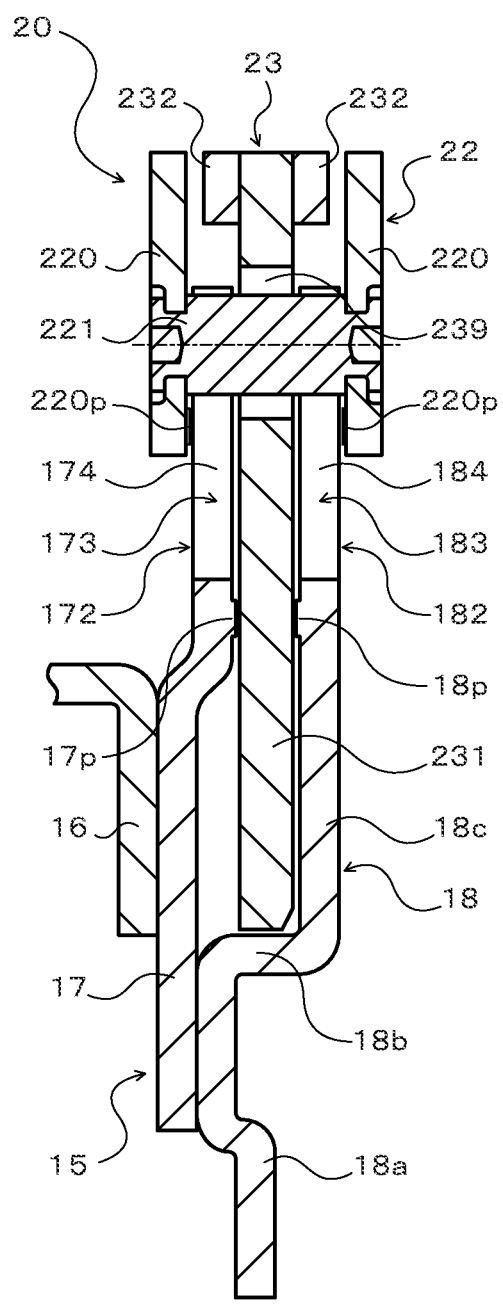
FIG. 4 is an enlarged cross-sectional view of a main part of the vibration damping device of the present disclosure.

As shown in FIGS. 3 and 4, the second driven plate 17 has a plurality of (for example, three in the present embodiment) protruding portions 172 that is formed so as to protrude radially outward from an outer peripheral surface 171 of the second driven plate 17 at intervals (equal intervals) in the circumferential direction. Each protruding portion 172 is formed with one slit (opening portion) 173 extending in the radial direction of the second driven plate 17. Each slit 173 has a pair of flat inner surfaces 174 that extend in the radial direction of the second driven plate 17 and that face each other at intervals in the circumferential direction of the second driven plate 17. The pair of inner surfaces 174 each functions as a torque transmission surface for transmitting and receiving torque to and from the weight body 22. In the present embodiment, as shown in FIG. 3, the slit 173 is formed so that an end portion on a radial outer side is opened. However, the slit 173 may be formed so that the end portion on the radial outer side is not opened.

As shown in FIG. 4, the third driven plate 18 has a plurality of (for example, three in the present embodiment) protruding portions 182 that is formed so as to protrude radially outward from an outer peripheral surface of the third driven plate 18 at intervals (equal intervals) in the circumferential direction. Each protruding portion 182 is formed with one slit (opening portion) 183 extending in the radial direction of the third driven plate 18. Each slit 183 has a pair of flat inner surfaces 184 that extend in the radial direction of the third driven plate 18 and that face each other at intervals in the circumferential direction of the third driven plate 18. The pair of inner surfaces 184 each functions as a torque transmission surface for transmitting and receiving torque to and from the weight body 22. In the present embodiment, the slit 183 is formed so that an end portion on a radial outer side is opened. However, the slit 183 may be formed so that the end portion on the radial outer side is not opened.

Figure 5:
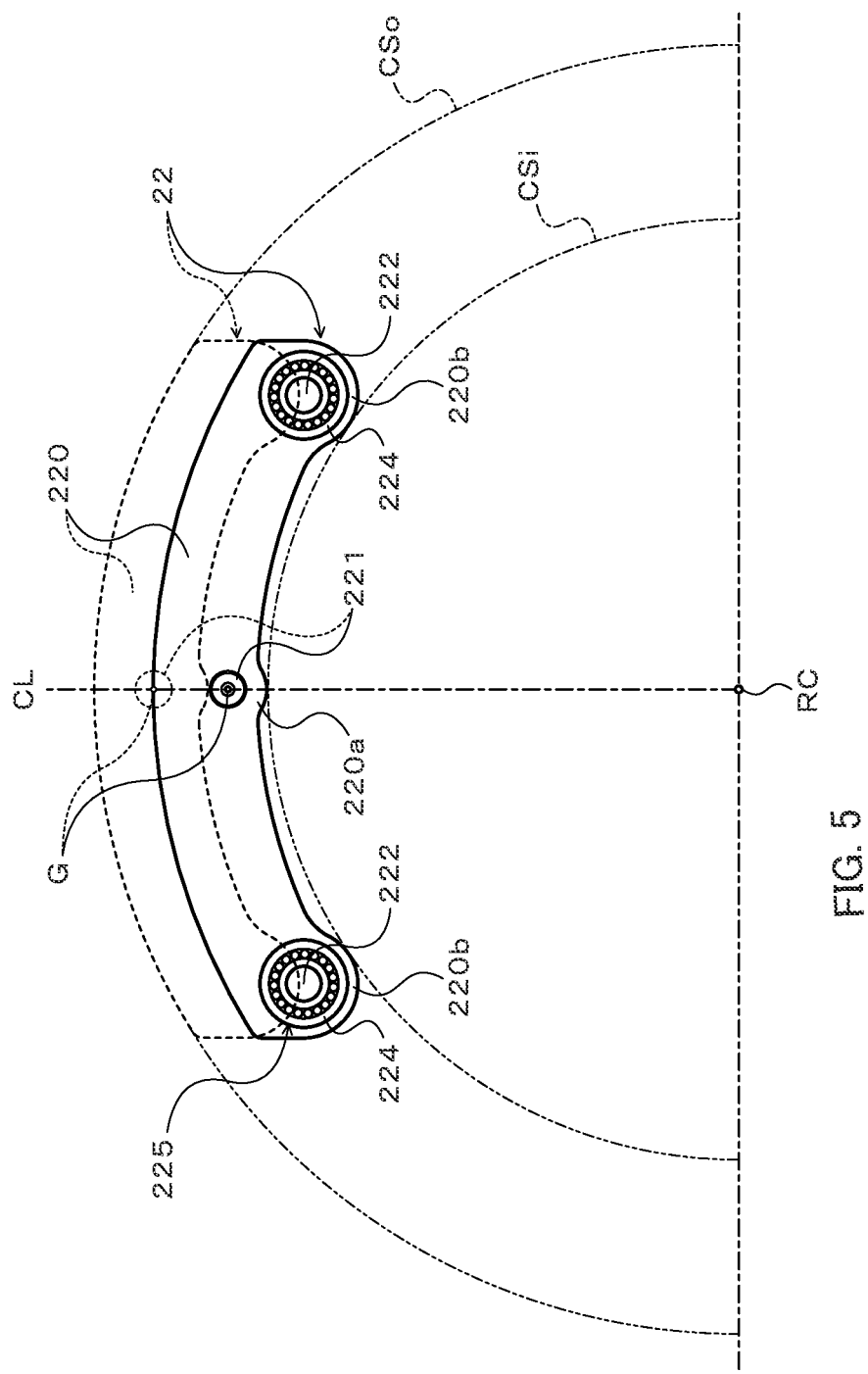
FIG. 5 is an explanatory view showing a restoring force generation member included in the vibration damping device of the present disclosure.

As shown in FIGS. 3 to 6, each weight body 22 has two plate members (mass bodies) 220 having the same shape as each other, one first coupling shaft 221, and two second coupling shafts 222. As shown in FIGS. 3 and 5, each plate member 220 is formed by a metal plate so as to have a symmetrical and arcuate planar shape, and the two plate members 220 are coupled to each other so as to face each other at an interval in the axial direction of the second and third driven plates 17, 18 via one first coupling shaft 221 and two second coupling shafts 222. As shown in FIG. 5, each plate member 220 has an outer peripheral surface formed by a cylindrical surface CSo and an inner peripheral surface having a concave curved surface. Further, the inner peripheral surface of each plate member 220 includes: a protruding portion 220a protruding in a direction away from the outer peripheral surface at a central portion of the plate member 220 in a width direction near the first coupling shaft 221, that is, near the first coupling shaft 221; and two protruding portions 220b that each protrude in a direction away from the outer peripheral surface at one end portion or the other end portion of the plate member 220. In the present embodiment, the protruding portions 220a, 220b both have a cylindrical surface, and the surfaces of the protruding portions 220a, 220b are in contact with a cylindrical surface CSi as shown in FIG. 5.

The first coupling shaft 221 is formed in the shape of a solid (or hollow) round bar, and as shown in FIGS. 3 and 5, the first coupling shaft 221 is fixed (coupled) to the two plate members 220 so that the shaft center of the coupling shaft 221 passes through a center of gravity G of the weight body 22 (plate member 220) on a center line CL (a straight line that passes through the rotation center RC of the second and third driven plates 17, 18 in the mounted state of the weight body 22) in the width direction (circumferential direction) of the weight body 22. The first coupling shaft 221 has an outer diameter shorter than an interval between the pair of inner surfaces 174, 184 of the second and third driven plates 17, 18 (widths of the slits 173, 183) and a radial length of the inner surfaces 174, 184. The first coupling shaft 221 is slidably disposed in the slit 173 of each protruding portion 172 of the second driven plate 17 so as to be in contact with either one of the pair of inner surfaces 174, and is slidably disposed in the slit 183 of each of the protruding portions 182 of the third driven plate 18 so as to be in contact with either one of the pair of inner surfaces 184.

As a result, each weight body 22 is coupled to the second and third driven plates 17, 18 serving as supporting members so as to be movable in the radial direction, and form a sliding pair with the second and third driven plates 17, 18. Further, the first coupling shaft 221 can come into contact with either one of the inner surfaces 174 of the corresponding slit 173 and the inner surfaces 184 of the corresponding slit 183 and thus, the first coupling shaft 221 functions as a torque transmission portion that transmits and receives torque to and from the second and third driven plates 17, 18. The first coupling shaft 221 may rotatably support a cylindrical outer ring via a plurality of rollers or balls (rolling bodies), or may rotatably support the outer ring without interposing a rolling element.

Figure 6:
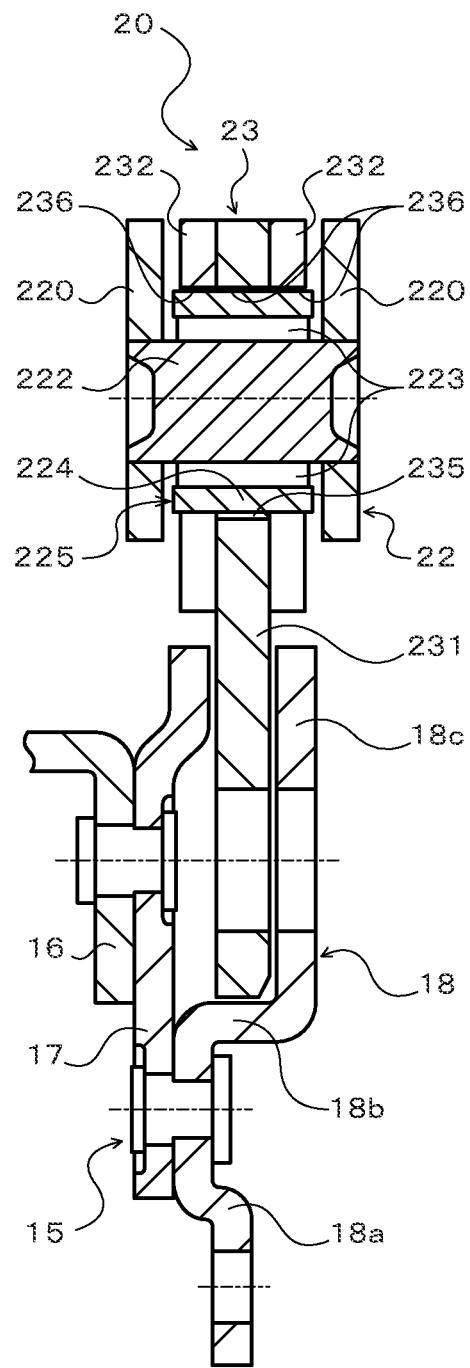
FIG. 6 is an enlarged cross-sectional view of a main part of the vibration damping device of the present disclosure.

Further, the two second coupling shafts 222 of each weight body 22 are formed in the shape of a solid (or hollow) round bar, and as shown in FIG. 3, the weight body 22 (plate member 220) is fixed to one end portion or the other end portion of the two plate members 220 so as to be positioned symmetrically with respect to the center line CL of the weight body 22 (plate member 220) that passes through the center of gravity G described above. That is, the shaft centers of the two second coupling shafts 222 fixed to the two plate members 220 are positioned symmetrically with respect to the center line CL in the width direction of the weight body 22. Further, as shown in FIGS. 3 and 6, the second coupling shaft 222 rotatably supports a cylindrical outer ring (roller) 224 via a plurality of rollers (rolling elements) 223, and the second coupling shaft 222, the plurality of rollers 223, and the outer ring 224 configure a guided portion 225 of the weight body 22. In the present embodiment, as shown in FIG. 5, since the protruding portion 220b is formed on both end portions of each plate member 220, the outer periphery of the outer ring 224 does not protrude outward of a peripheral edge portion of the plate member 220. A plurality of balls may be arranged in place of the plurality of rollers 223 between the second coupling shaft 222 and the outer ring 224, or the rollers and balls may be omitted.

The inertia mass body 23 includes one annular first plate member 231 formed of a metal plate and two annular second plate members 232 formed of a metal plate, and an annular second plate member 232 formed of a metal plate. The weight of the inertia mass body 23 (first and second plate members 231, 232) is set to be sufficiently heavier than the weight of one weight body 22. In the present embodiment, the curvature radius of an outer peripheral surface of the first plate member 231 and the curvature radius of an outer peripheral surface of each second plate member 232 are set to be the same. Further, as shown in FIGS. 4 and 6, an inner peripheral surface of each second plate member 232 is formed to be positioned radially outward of an inner peripheral surface of the first plate member 231, when the second plate member 232 is disposed coaxially with the first plate member 231. Further, as shown in FIGS. 4 and 6, the thickness of each second plate member 232 is set to be less than the thickness of the second and third driven plates 17, 18 (protruding portions 172, 182).

Further, as shown in FIGS. 3 and 6, the first plate members 231 has a plurality of (for example, six in the present embodiment) guide portions 235 arranged at intervals in the circumferential direction so as to be in pairs in two by two. Each guide portion 235 is an opening portion extending in a bow shape, and guides the guided portion 225 of each corresponding weight body 22. In the present embodiment, with respect to the first plate member 231, the two paired guide portions 235 are formed to be symmetrical with respect to a straight line extending in the radial direction so as to divide the first plate member 231 into thirds around the center (a straight line that equally divides the first plate member 231 and the like into the number of weight bodies 22).

As shown in FIG. 3, each guide portion 235 includes a guide surface 236 having a concave curved surface shape and that is a rolling surface of the outer ring 224 configuring the guided portion 225 of the weight body 22, a supporting surface 237 having a convex curved surface shape and that faces the guide surface 236 on the inner peripheral side of the first plate member 231, etc. (on the center side of the first plate member 231, etc.) than the guide surface 236, and two stopper surfaces 238 continuous with both the guide surface 236 and the supporting surface 237 on both sides thereof. The guide surface 236 is formed so as to swing around a virtual axis 24 so that the center of gravity G of the weight body 22 swings with respect to (approaches and moves away from) a rotation center RC of the second and third driven plates 17, 18 along the radial direction, while changing an inter-axial distance L1 between the virtual axis 24 that is set so that the relative position with respect to the inertia mass body 23 is constant, by having the outer ring 224 roll on the guide surface 236 in accordance with the rotation of the second and third driven plates 17, 18.

The virtual axis 24 is a point on a straight line that divides the first plate member 231, etc. into thirds around the center and that extends in the radial direction (a straight line that equally divides the first plate member 231, etc. by the number of weight bodies 22), and is a straight line orthogonal to the first plate member 231, etc. and passes through a point spaced away from the center (rotation center RC) of the first plate member 231, etc. by a predetermined fixed inter-axial distance L2. Further, the supporting surface 237 is a convex surface formed so as to face the guide surface 236 at an interval set to be slightly larger than the outer diameter of the outer ring 224, and the stopper surface 238 is a concave surface extending in an arc shape, for example. In the present embodiment, as shown in FIG. 6, on the inner peripheral surface of the second plate member 232, the plurality of guide surfaces 236 are formed at intervals in the circumferential direction so as to be continuous with the guide surface 236 of each guide portion 235 of the first plate member 231.

As shown in FIGS. 4 and 6, the second and third driven plates 17, 18 serving as supporting members are disposed in the axial direction between the two plate members 220 configuring the weight body 22. Further, the second driven plate 17 and the annular portion 18c of the third driven plate 18 face each other at an interval in the axial direction as described above, and the first plate member 231 of the inertia mass body 23 is disposed between the second driven plate 17 and the annular portion 18c of the third driven plate 18 in the axial direction. The inner peripheral surface of the first plate member 231 is rotatably supported by the outer peripheral surface of the cylindrical portion 18b of the third driven plate 18. As a result, the inertia mass body 23 is rotatably supported with respect to the damper hub 7 by the driven member 15 so as to be rotatably supported around the rotation center RC by the second and third driven plates 17, 18 and thus, the second and third driven plates 17, 18 form a rotation pair. Then, each second plate member 232 of the inertia mass body 23 is fixed to the surface of the first plate member 231 via a fixing tool not shown so that each second plate member 232 of the inertia mass body 23 is disposed between the two plate members 220 of the weight body 22 and so as to be positioned on the corresponding one radial outer side of the second and third driven plates 17, 18 (protruding portions 172, 182).

Further, as shown in FIGS. 4 and 6, the two plate members 220 of the weight body 22 are coupled to each other by the first and second coupling shafts 221, 222 so as to sandwich the second and third driven plates 17, 18 (protruding portions 172, 182) and the inertia mass body 23 from both sides in the axial direction. Further, as shown in FIGS. 3 and 4, on the first plate member 231 of the inertia mass body 23, an opening portion 239 extending in an arc shape is formed, and the first coupling shaft 221 of the weight body 22 is inserted in the opening portion 239. In the present embodiment, the inner surface of the opening portion 239 is formed so as not to come into contact with the first coupling shaft 221. Further, as shown in FIG. 6, each second coupling shaft 222 coupling the two plate members 220 passes through the corresponding guide portion 235 of the inertia mass body 23 (first plate member 231), and each outer ring 224 is in contact with the guide surface 236 of the corresponding guide portion 235.

As described above, in the vibration damping device 20, the weight body 22 and the second and third driven plates 17, 18 form a sliding pair, and the second and third driven plates 17, 18 and the inertia mass body 23 form a rotating pair. Further, since the outer ring 224 of each weight body 22 can roll on the guide surface 236 of the corresponding guide portion 235, each weight body 22 and the inertia mass body 23 form a sliding pair. As a result, the second and third driven plates 17, 18, the plurality of weight bodies 22, and the inertia mass body 23 of the guide portion 235 configure the slider crank mechanism (double slider crank chain). The equilibrium state of the vibration damping device 20 is a state in which the center of gravity G of each weight body 22 is positioned on a straight line passing through the corresponding virtual axis 24 and the rotation center RC, that is, on the center line CL (see FIG. 3).

Further, in the present embodiment, the plate member 220 of each weight body 22 and the inertia mass body 23 (first and second plate members 231, 232) are disposed so as to be offset in the axial direction of the second and third driven plates 17, 18 serving as supporting members and the second and third driven plates 17, 18 are disposed between the plate member 220 of each weight body 22 and the inertia mass body 23. That is, the second driven plate 17 (protruding portion 172) is disposed between one plate member 220 of each weight body 22 and the first plate member 231 of the inertia mass body 23 in the axial direction, and the third driven plate 18 (protruding portion 182) is disposed between the other plate member 220 of each weight body 22 and the first plate member 231 of the inertia mass body 23 in the axial direction. Further, each weight body and inertia mass body 23 (first and second plate members 231, 232) are at least partially overlapped in the radial direction with the first and second springs SP1, SP2 of the damper device 10 when seen from the axial direction (turbine runner 5 side).

In addition, as shown in FIG. 4, each plate member 220 of the weight body 22 is in contact with the surface of the protruding portion 172 of the second driven plate 17 or the surface of the protruding portion 182 of the third driven plate 18 and thus, at least one protrusion (dowel) 220p that restricts the axial movement of the plate member 220 with respect to the second and third driven plates 17, 18 is formed. As shown in FIG. 4, in the second driven plate 17, a plurality of protrusions (dowels) 17p that is in contact with one surface of the first plate member 231 of the inertia mass body 23 and that restrict axial movement of the inertia mass body 23 is formed at intervals in the circumferential direction. Further, as shown in FIG. 4, in the third driven plate 18, a plurality of protrusions (dowels) 18p that is in contact with the other surface of the first plate member 231 of the inertia mass body 23 and that restrict axial movement of the inertia mass body 23 is formed at intervals in the circumferential direction. In the second and third driven plates 17, 18, protrusions that are in sliding contact with each plate member 220 of the weight body 22 may be formed. In the first plate member 231 of the inertia mass body 23, protrusions that are in sliding contact with the second and third driven plates 17, 18, may be formed.

Subsequently, the operation of the starting device 1 including the vibration damping device 20 will be described. In the starting device 1, when the lockup is released by the lockup clutch 8, as can be seen from FIG. 1, the torque (power) from the engine EG serving as the motor is transmitted to the input shaft IS of the transmission TM via a path of the front cover 3, the pump impeller 4, the turbine runner 5, and the damper hub 7. Further, when the lockup is executed by the lockup clutch 8, as can be seen from FIG. 1, the torque (power) from the engine EG is transmitted to the input shaft IS of the transmission TM via a path of the front cover 3, the lockup clutch 8, the drive member 11, the first spring SP1, the intermediate member 12, the second spring SP2, the driven member 15, and the damper hub 7.

In case in which the lockup is executed by the lockup clutch 8, when the drive member 11 coupled to the front cover 3 by the lockup clutch 8 rotates in accordance with the rotation of the engine EG, the first and second springs SP1, SP2 acts in series via the intermediate member 12 between the drive member 11 and the driven member 15 until the torque transmitted to the drive member 11 reaches the torque T1. As a result, the torque from the engine EG transmitted to the front cover 3 is transmitted to the input shaft IS of the transmission TM, and the fluctuation of the torque from the engine EG is dampened (absorbed) by the first and second springs SP1, SP2 of the damper device 10. Further, when the torque transmitted to the drive member 11 is equal to or more than the torque T1, the fluctuation of the torque from the engine EG is damped (absorbed) by the first spring SP1 of the damper device 10 until the torque reaches the torque T2.

Further, in the starting device 1, when the damper device 10 coupled to the front cover 3 by the lockup clutch 8 in accordance with the execution of the lockup rotates together with the front cover 3, the second and third driven plates 17, 18 (driven member 15) of the damper device 10 also rotates around the shaft center of the starting device 1 in the same direction as the front cover 3. When the second and third driven plates 17, 18 rotate, the first coupling shaft 221 of each weight body 22 is in contact with either one of the pair of inner surfaces 174, 184 of the corresponding slits 173, 183 in accordance with the rotation direction of the second and third driven plates 17, 18. Further, the outer ring 224 supported by the second coupling shaft 222 of the weight body 22 is pressed against the guide surface 236 of the corresponding guide portion 235 of the inertia mass body 23 due to the application of the centrifugal force on the weight body 22, and one end portion of the guide portion 235 rolls on the guide surface 236 by receiving the force of the moment of inertia (rotational difficulty) of the inertia mass body 23.

Figure 7:
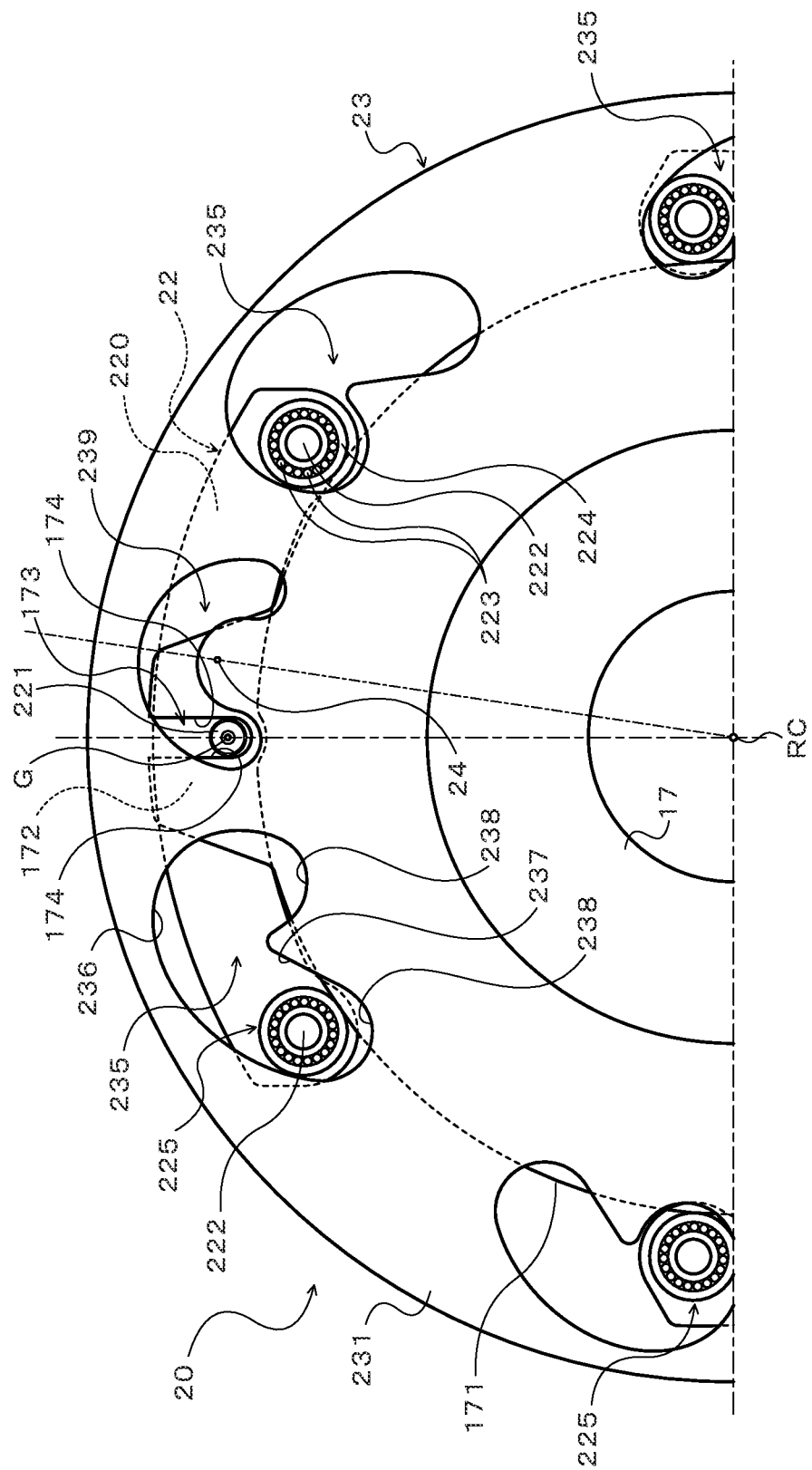
FIG. 7 is an enlarged view showing the vibration damping device of the present disclosure.

As a result, as shown in FIG. 7, when the second and third driven plates 17, 18 rotate in one direction around the rotation center RC (for example, in the counterclockwise direction in the figure), each weight body 22 (center of gravity G) approaches the rotation center RC along the radial direction of the second and third driven plates 17, 18 while each weight body 22 is guided by the two (a pair of) guided portion 225 (the outer ring 224 and the second coupling shaft 222) and two (a pair of) guide portions 235 and the rotation of each weight body 22 is restricted. Further, since the guided portion 225 is guided by the guide portion 235, the center of gravity G of each weight body 22 rotates while changing the inter-axial distance L1 around the virtual axis 24 serving as the swinging center, and accordingly, the inertia mass body 23 relatively rotates around the rotation center RC in the reverse direction with respect to the second and third driven plates 17, 18.

Further, a component force of the centrifugal force acting on the center of gravity G of each weight body 22 is transmitted to the inertia mass body 23 via the guided portion 225 (outer ring 224) and the guide surface 236 of the guide portion 235, and becomes a restoring force that tries to return the inertia mass body 23 to the position in the equilibrium state. At the end portion of a swinging range of the weight body 22 determined in accordance with the vibration amplitude (vibration level) transmitted from the engine EG to the second and third driven plates 17, 18 (driven member 15), the restoring force overcomes the force (moment of inertia) that tries to make the inertia mass body 23 rotate in the rotation direction the same as before. Thus, each weight body 22 is guided by the pair of guided portions 225 and the pair of guide portions 235, and is moved in the direction opposite to the direction before so as to be spaced away from the rotation center RC along the radial direction of the second and third driven plates 17, 18 while being restricted from rotating. Further, the inertia mass body 23 rotates around the rotation center RC in the direction opposite to the direction before toward the position in the equilibrium state while being interlocked with each weight body 22 by the application of the restoring force from each weight body 22, that is, the component force of the centrifugal force described above.

When the inertia mass body 23 reaches the position in the equilibrium state while the second and third driven plates 17, 18 rotate in one direction described above, the inertia mass body 23 tries to further rotate in the same direction due to the moment of inertia (difficulty of stopping). Further, the outer ring 224 of the weight body 22 receives a force due to the moment of inertia (difficulty of stopping) of the inertia mass body 23 and rolls on the guide surface 236 toward the other end portion of the guide portion 235. Thus, each weight body 22 (center of gravity G) is guided by the pair of guided portions 225 and the pair of guide portions 235, and approaches the rotation center RC again, along the radial direction of the second and third driven plates 17, 18 while being restricted from rotating. Further, since the guided portion 225 is guided by the guide portion 235, the center of gravity G of each weight body 22 rotates while changing the inter-axial distance L1 around the virtual axis 24 serving as the swinging center, and accordingly, the inertia mass body 23 relatively rotates around the rotation center RC in the same direction with respect to the second and third driven plates 17, 18.

Also in this case, the component force of the centrifugal force acting on the center of gravity G of each weight body 22 is transmitted as the restoring force described above to the inertia mass body 23 via the guided portion 225 and the guide surface 236 of the guide portion 235, and overcomes the force (moment of inertia) that tries to make the inertia mass body 23 rotate in the rotation direction the same as before, at the end portion in the swinging range. Thus, each weight body 22 is guided by the pair of guided portions 225 and the pair of guide portions 235, and is moved so as to be spaced away from the rotation center RC along the radial direction of the second and third driven plates 17, 18 while being restricted from rotating. Further, the inertia mass body 23 rotates around the rotation center RC toward the position in the equilibrium state while being interlocked with each weight body 22 by the application of the restoring force from each weight body 22, that is, the component force of the centrifugal force described above.

In this way, when the second and third driven plates 17, 18 (driven member 15) rotate in one direction, each weight body 22 serving as a restoring force generation member of the vibration damping device 20 swings (performs reciprocating motion) with respect to the rotation center RC along the radial direction of the second and third driven plates 17, 18 in the swinging range centered around the position in the equilibrium state that is set in accordance with the amplitude (vibration level) of the vibration transmitted from the engine EG to the driven member 15. Further, the component force of the centrifugal force acting on each weight body 22 is transmitted as a restoring force to the inertia mass body 23 via the guided portion 225 and the guide portion 235, and the inertia mass body 23 swings (performs reciprocating rotary motion) in the opposite direction of the second and third driven plates 17, 18 around the rotation center RC in the swinging range centered around the position in the equilibrium state that is set in accordance with the swinging range of each weight body 22.

As a result, a torque (inertial torque) having a phase opposite to a fluctuating torque (vibration) transmitted from the engine EG to the drive member 11 from the swinging inertia mass body 23 can be applied to the second and third driven plates 17, 18 via each guide portion 235, the guided portion 225, and each weight body 22, the first coupling shaft 221, and the protruding portions 172, 182. As a result, by setting the specifications of the vibration damping device 20 so as to have an order in accordance with an order of vibration transmitted from the engine EG to the second and third driven plates 17, 18 (excitation order: a 1.5th order when the engine EG is a 3-cylinder engine, and a second order when the engine EG is a 4-cylinder engine), it is possible to satisfactorily dampen the vibration transmitted from the engine EG to the driven member 15 (second and third driven plates 17, 18) by the vibration damping device 20 regardless of the rotation speed of the engine EG (second and third driven plates 17, 18).

In the vibration damping device 20, it is possible to restrict rotation of each weight body 22 by the pair of guided portions 225 and the pair of guide portions 235, and suppress a decrease in the order of the vibration damping device 20 resulting from an increase in the equivalent mass due to the rotation of the weight body 22. Further, it is possible to suppress damping of the centrifugal force (the component force thereof) acting on the weight body 22 used as the restoring force for swinging the inertia mass body 23 by smoothing swinging the weight body 22 with respect to the second and third driven plates 17, 18. In addition, by suppressing the decrease of the order resulting from the rotation of the weight body 22, it is possible to sufficiently secure the weight of the inertia mass body 23 and satisfactorily obtain a vibration damping effect. Further, by defining (constraining) the movement of each weight body 22 by the pair of guided portions 225 and the pair of guide portions 235, it is possible to decrease the frictional force between the first coupling shaft 221 and the protruding portions 172, 182 of the second and third driven plates 17, 18 when torque is transmitted and received between each weight body 22 and the second and third driven plates 17, 18.

Further, in each weight body 22, the two guided portions 225 are arranged symmetrically with respect to the center line CL in the width direction of the plate member 220, and the first coupling shaft 221 serving as the torque transmission portion is installed on the center line CL. As a result, the weight body 22 can be swung more smoothly while the rotation is restricted by the pair of guide portions 235 and the pair of guided portions 225, and the frictional force generated between the first coupling shaft 221 and the protruding portions 172, 182 can be reduced to satisfactorily suppress the centrifugal force acting on the weight body 22 from being dampened. Further, in the vibration damping device 20, the guided portion 225 is provided on the weight body 22, and the guide portion 235 is formed on the inertia mass body 23. As a result, the centrifugal force acting on the weight body 22 by moving the center of gravity G of the weight body 22 from the rotation center RC, that is, the restoring force acting on the inertia mass body 23 can be suppressed from decreasing, and the vibration damping performance can be satisfactorily ensured. However, in the vibration damping device 20, the guide portion 235 may be provided on the weight body 22, and the guided portion 225 may be formed on the inertia mass body 23.

Subsequently, the design procedure of the vibration damping device 20 will be described with reference to FIGS. 8 to 13.

The present inventors carried out intensive research to further improve the vibration damping performance of the vibration damping device 20 including the weight body 22 that swings in the radial direction of the driven member 15 in accordance with the rotation of the driven member 15 and the inertia mass body 23 that swings around the rotation center RC in conjunction with the weight body 22, and focused on the relationship between the axial length L1 between the center of gravity G of the weight body 22 and the virtual axis 24 that is the swing center of the weight body 22 and the inter-axial distance L2 between the virtual axis 24 and the rotation center RC of the driven member 15. For example, in the vibration damping device of Patent Document 1, the sum of a distance L3 between the center of gravity of each weight body and the swing center of the weight body and a distance L4 between the swing center of the weight body and the rotation center (L3+L4) is constant. It is considered that the distances L3 and L4 (the ratio of the two) are set so that when the amplitude of the inertia mass body (the swing angle around the rotation center of the inertia mass body proportional to the swing angle of the weight body) is large, the deviation of the order of the vibration damping device is small and isochronism is satisfactorily ensured. In contrast, the present inventors performed various analyses in which while the sum of the inter-axial distances L1, L2 is constant, the ratio of the two is changed, and the inter-axial distance L1 is varied. The present inventors found out, as a result, that the vibration damping device 20 including the weight body 22 that swings in the radial direction of the driven member 15 and the inertia mass body 23 that swings around the rotation center RC in conjunction with the weight body 22 has the characteristics (1) to (6) below.

Figure 8:
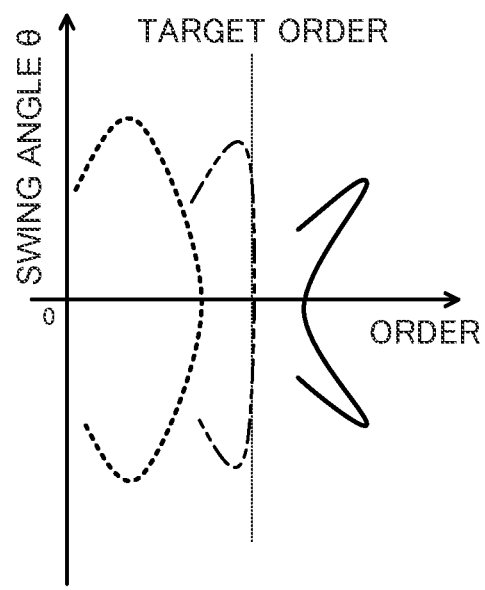
FIG. 8 is a diagram showing characteristics of the vibration damping device including a restoring force generation member that can swing in accordance with the rotation of the supporting member and an inertia mass body that swings in conjunction with the restoring force generation member.

(1) As shown in FIG. 8, in a case in which the sum of the inter-axial distances L1, L2 (L1+L2) is constant and the values of the inter-axial distances L1, L2 in which isochronism is satisfactorily ensured in the vibration damping device 20 are each set to one value (see the long dashed double short dashed line in the figure), when the inter-axial distance L1 is decreased while the sum of the inter-axial distances L1, L2 is kept constant, as shown by the solid line in the figure, the order of the vibration damping device 20 when a vibration angle θ of the weight body 22 with respect to the inertia mass body 23 is zero (the order of the vibration that is satisfactorily damped by the vibration damping device 20) is increased, and basically, the order of the vibration damping device 20 is increased as the vibration angle θ is increased (isochronism is impaired).

(2) As shown in FIG. 8, in a case in which the sum of the inter-axial distances L1, L2 (L1+L2) is constant and the values of the inter-axial distances L1, L2 in which isochronism is satisfactorily ensured in the vibration damping device 20 are each set to one value (see the long dashed double short dashed line in the figure), when the inter-axial distance L1 is increased while the sum of the inter-axial distances L1, L2 is kept constant, as shown by the dotted line in the figure, the order of the vibration damping device 20 when the vibration angle θ of the weight body 22 is zero is decreased, and basically, the order of the vibration damping device 20 is decreased as the vibration angle θ is increased (isochronism is impaired).

Figure 9:
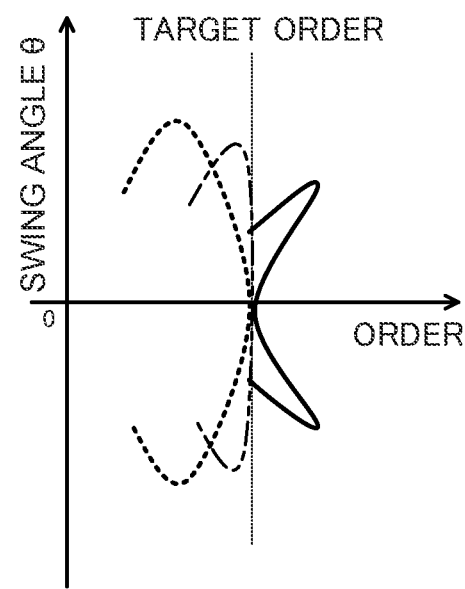
FIG. 9 is a diagram showing characteristics of the vibration damping device including the restoring force generation member that can swing with the rotation of the supporting member and the inertia mass body that swings in accordance with the restoring force generation member.

(3) When the inter-axial distance L1 is decreased while the sum of the inter-axial distances L1, L2 is kept constant, by increasing the moment of inertia (inertia) of the inertia mass body 23, the order of the vibration damping device 20 when the swing angle θ of the weight body 22 with respect to the inertia mass body 23 is zero is decreased, as shown by the solid line in FIG. 9.

(4) When the inter-axial distance L1 is increased while the sum of the inter-axial distances L1, L2 is kept constant, by decreasing the moment of inertia of the inertia mass body 23, the order of the vibration damping device 20 when the swing angle θ of the weight body 22 with respect to the inertia mass body 23 is zero is increased, as shown by the dotted line in FIG. 9.

Figure 10:
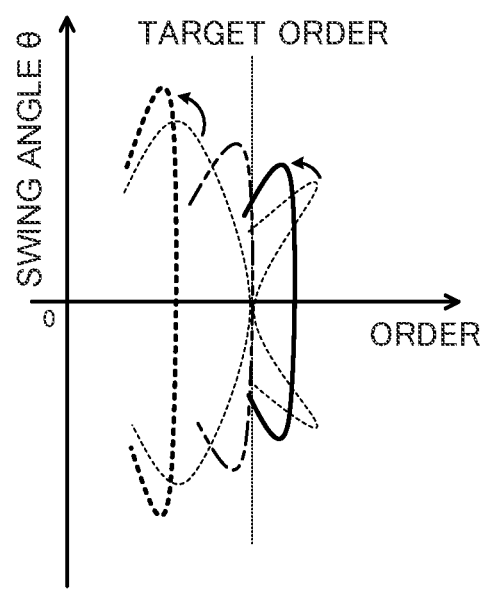
FIG. 10 is a diagram showing characteristics of the vibration damping device including the restoring force generation member that can swing in accordance with the rotation of the supporting member and the inertia mass body that swings in conjunction with the restoring force generation member.

(5) In a case in which the inter-axial distance L1 is decreased while the sum of the inter-axial distances L1, L2 is kept constant, when the inter-axial distance L1 is gradually increased as the swing angle θ (absolute value) is increased from the state in which the swing angle θ of the weight body 22 with respect to the inertia mass body 23 is zero, as shown by a solid line in FIG. 10, the deviation of the order of the vibration damping device 20 in accordance with the increase in the swing angle θ is suppressed so that isochronism can be ensured.

(6) In a case in which the inter-axial distance L1 is increased while the sum of the inter-axial distances L1, L2 is kept constant, when the inter-axial distance L1 is gradually decreased as the swing angle θ (absolute value) is increased from the state in which the swing angle θ of the weight body 22 with respect to the inertia mass body 23 is zero, as shown by a dotted line in FIG. 10, the deviation of the order of the vibration damping device 20 in accordance with the increase in the swing angle θ is suppressed so that isochronism can be ensured.

Figure 11:
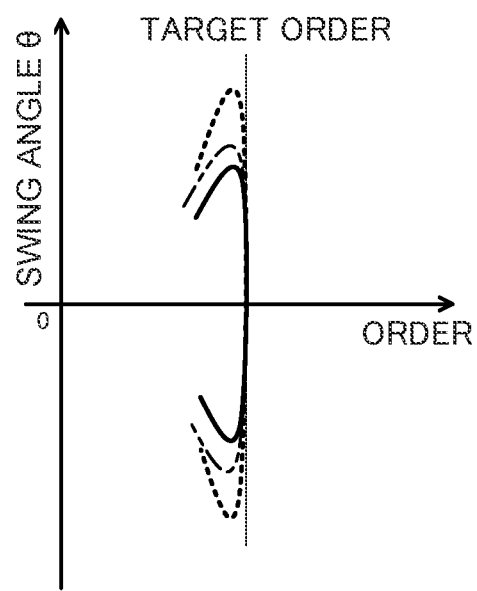
FIG. 11 is a chart showing the characteristics of the vibration damping device of the present disclosure.

Based on the above findings (1) to (6), the vibration damping device 20 of the present disclosure is configured so that the inter-axial distance L1 between the center of gravity G of the weight body 22 and the virtual axis 24 serving as the swing center changed in accordance with the change in the swing angle θ (the swing angle of the inertia mass body 23 around the rotation center RC) of the weight body 22 with respect to the inertia mass body 23. As a result, by increasing and decreasing the inter-axial distance L1 between the center of gravity G of the weight body 22 when the swing angle θ is zero and the virtual axis 24 that is the swing center and by increasing and decreasing the moment of inertia of the inertia mass body 23 in accordance with the increase and decrease of the inter-axial distance L1, while suppressing the deviation of the order in accordance with the increase of the swing angle θ of the weight body 22 with respect to the inertia mass body 23, it is possible to match the order of the vibration damping device 20 to the target order as shown in FIG. 11, and it is also possible to adjust the torque (inertia torque) applied to the driven member 15 from the inertia mass body 23.

Figure 12:
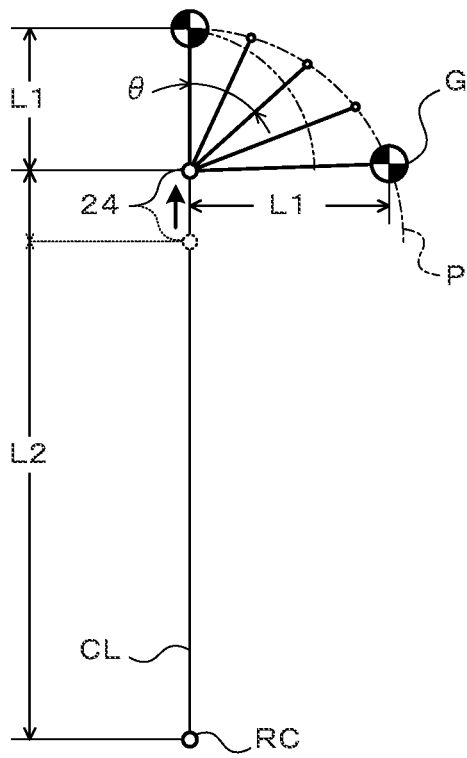
FIG. 12 is a schematic diagram for describing the configuration of the vibration damping device of the present disclosure.

That is, when the inter-axial distances L1, L2 (ratio of both) are each set to be constant so as to satisfactorily ensure isochronism and the virtual axis 24 is at the position indicated by the dotted line in the figure, as shown in FIG. 12, by moving the virtual axis 24 radially outward on the center line CL (a straight line including the virtual axis 24 (swing center) and the rotation center RC), it is possible to shorten the inter-axial distance L1 when the swing angle θ of the weight body 22 is zero with respect to the inertia mass body 23 while keeping the sum (L1+L2) of the inter-axial distances L1, L2 constant. In this case, from the above characteristic (1), the order of the vibration damping device 20 when the swing angle θ is zero is increased and the order is increased as the swing angle θ is increased. In contrast, by increasing the moment of inertia of the inertia mass body 23 based on the above characteristic (3), the order of the vibration damping device 20 when the swing angle θ of the weight body 22 with respect to the inertia mass body 23 is zero can be decreased to return to the order before the inter-axial distance L1 was decreased. As shown in FIG. 12, by gradually increasing the inter-axial distance L1 as the swing angle θ is increased from the state in which the swing angle θ of the weight body 22 with respect to the inertia mass body 23 is zero based on the characteristic (5) described above, the deviation of the order of the vibration damping device 20 in accordance with the increase in the swing angle θ can be suppressed to satisfactorily ensure isochronism.

As a result, the order of the vibration damping device 20 can be matched with the target order while the deviation of the order in accordance with the increase of the swing angle θ is suppressed, and the torque (inertial torque) applied to the driven member 15 from the inertia mass body 23 can be increased. As a result, it is possible to satisfactorily dampen vibration of the target order while ensuring isochronism in the vibration damping device 20 and suppressing the increase of the moment of inertia of each weight body 22.

Further, the shape of the guide surface 236 of each guide portion 235 of the inertia mass body 23 (first plate member 231) can be determined as follows. That is, after swing trajectory P (see FIG. 12) of the center of gravity G is set by analysis and the like so that the inter-axial distance L1 between the center of gravity G and the virtual axis 24 (swing center) is increased as the swing angle θ of the weight body 22 is increased, the center of gravity G of the weight body 22 is positioned on the swing trajectory P, the two outer rings 224 (guided portions 225) are disposed symmetrically with respect to the center line CL, and a line segment connecting the axial centers of the two outer rings 224 are defined. Next, the center of gravity G of the weight body 22 is rotated around the virtual axis 24 by a minute constant angle so as to move along the swing trajectory P and the two outer rings 224 are move so that the line segment connecting the shaft centers of the two outer rings 224 to each other is orthogonal to the center line CL while maintaining the positional relationship with the center of gravity G. Thereafter, by repeatedly executing this process and defining a curved surface in contact with each outer ring 224 (a curved surface in contact on the radial outer side), the guide surface 236 of the guide portion 235 as shown by a solid line in FIG. 3 can be obtained. The shapes of the supporting surface 237 and the stopper surface 238 can be arbitrarily determined in consideration of the outer diameter of the outer ring 224.

Figure 13:
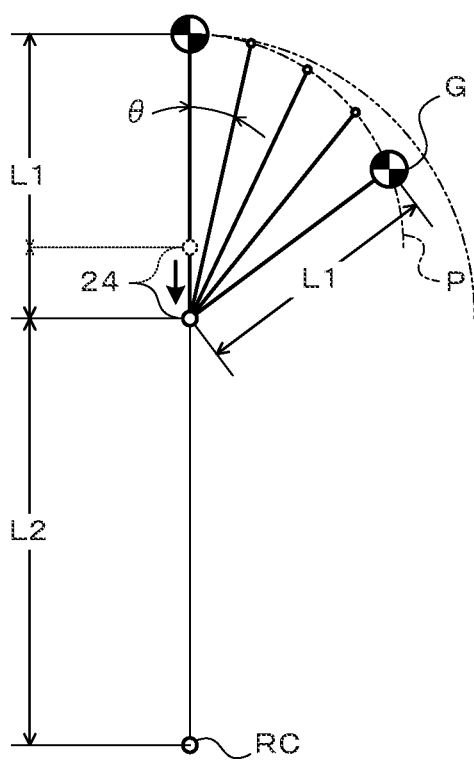
FIG. 13 is a schematic diagram for describing the configuration of the vibration damping device of the present disclosure.

In contrast, when the inter-axial distances L1, L2 (ratio of both) are each set to be constant so as to satisfactorily ensure isochronism and the virtual axis 24 is at the position indicated by the dotted line in the figure, as shown in FIG. 13, by moving the virtual axis 24 radially inward on the center line CL (a straight line including the virtual axis 24 (swing center) and the rotation center RC), it is possible to increase the inter-axial distance L1 when the swing angle θ of the weight body 22 is zero with respect to the inertia mass body 23 while keeping the sum (L1+L2) of the inter-axial distances L1, L2 constant. In this case, from the above characteristic (2), the order of the vibration damping device 20 when the swing angle θ is zero is decreased and the order is increased as the swing angle θ is decreased. In contrast, by decreasing the moment of inertia of the inertia mass body 23 based on the above characteristic (4), the order of the vibration damping device 20 when the swing angle θ of the weight body 22 with respect to the inertia mass body 23 is zero can be increased to return to the order before the inter-axial distance L1 was increased. As shown in FIG. 13, by gradually decreasing the inter-axial distance L1 as the swing angle θ is increased from the state in which the swing angle θ of the weight body 22 with respect to the inertia mass body 23 is zero based on the characteristic (6) described above, the deviation of the order of the vibration damping device 20 in accordance with the increase in the swing angle θ can be suppressed to satisfactorily ensure isochronism.

As a result, the order of the vibration damping device 20 can be matched with the target order while the deviation of the order in accordance with the increase of the swing angle θ is suppressed, and the torque (inertial torque) applied to the driven member 15 from the inertia mass body 23 can be decreased. As a result, it is possible to satisfactorily dampen vibration of the target order while ensuring isochronism in the vibration damping device 20 and suppressing the fluctuation of the moment of inertia of each weight body 22. In this case, as shown in FIG. 13, the swing trajectory P of the center of gravity G of the weight body 22 is set by analysis and the like so that the inter-axial distance L1 between the center of gravity G and the virtual axis 24 (swing center) is increased as the swing angle θ of the weight body 22 is increased, and the shape of the guide surface 236 (see the dotted line in FIG. 3) of each guide portion 235 of the inertia mass body 23 (first plate member 231) is set similarly to a case in which the inter-axial distance L1 between the center of gravity G and the virtual axis 24 (swing center) is increased as the swing angle θ is increased.

Figure 14:
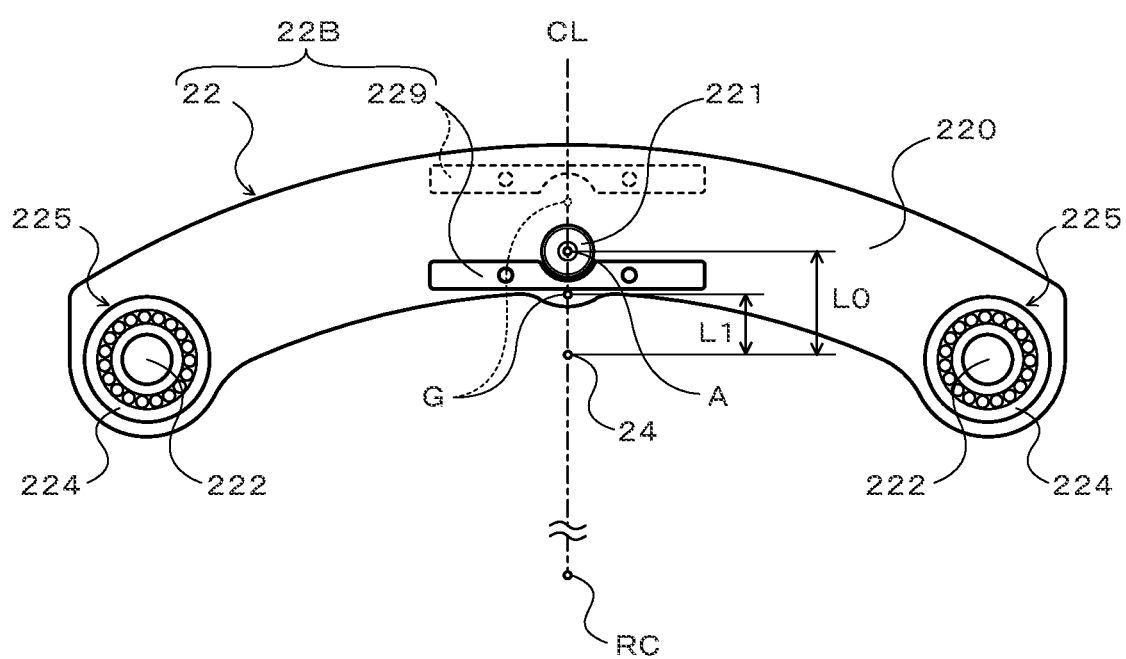
FIG. 14 is a front view showing another restoring force generation member that can be applied to the vibration damping device of the present disclosure.

FIG. 14 is a front view showing another weight body 22B that can be applied to the vibration damping device 20 described above. Among elements related to the weight body 22B, the same elements as those of the vibration damping device 20 and the like described above are designated by the same reference numerals, and redundant description will be omitted.

The weight body 22B shown in FIG. 14 includes the weight body 22 serving as a weight main body and a center of gravity adjusting weight 229 fixed to the weight body 22. Similar to the weight body described above, the weight body 22 includes the two plate members 220, and the first coupling shaft 221 that is fixed (coupled) to the two plate member 220 so that the shaft center A serving as a reference point passes through the center of gravity of the weight body 22 on the center line CL in the width direction (circumferential direction) of the weight body 22 (plate member 220). The center of gravity adjusting weight 229 is formed of metal, for example, and the center of gravity adjusting weight 229 is fixed to each plate member 220 so that the center of gravity G of the weight body 22B, which serves as the restoring force generation member including the weight body 22 and the center of gravity adjusting weight 229, is positioned radially inward of the shaft center A (reference point) of the first coupling shaft 221 on the center line CL that includes the virtual axis 24, which serves as the swing center, and the rotation center RC when the swing angle θ of the weight body 22B with respect to the inertia mass body 23 is zero. In other words, the center of gravity of the weight body 22 before the center of gravity adjusting weight 229 is fixed, that is, the shaft center A (reference point) of the first coupling shaft 221, is positioned radially outward of the center of gravity G of the weight body 22B on the center line CL when the swing angle θ is zero.

Figure 15:
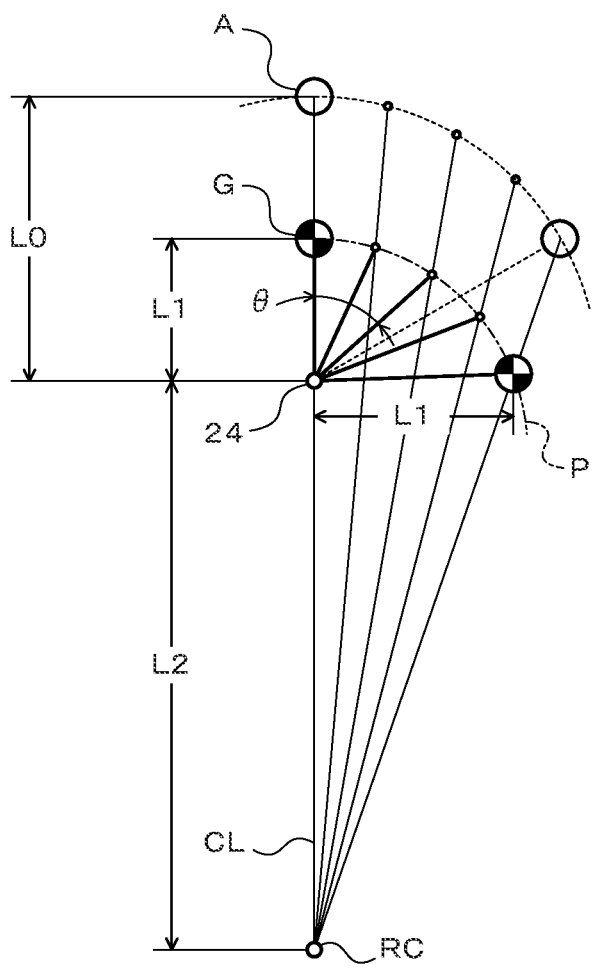
FIG. 15 is a schematic view for describing the configuration of the vibration damping device including the restoring force generation member in FIG. 14.

In the vibration damping device 20 including the weight body 22B, the inter-axial distance L1 between the center of gravity G of the weight body 22B and the virtual axis 24 is shorter than an inter-axial distance L0 between the shaft center A of the first coupling shaft 221 (the center of gravity of the weight body 22 before the center of gravity adjusting weight 229 is fixed) and the virtual axis 24, when the swing angle θ of the weight body 22B with respect to the inertia mass body 23 is zero, as shown in FIG. 14 and FIG. 15. Further, in the vibration damping device 20 including the weight body 22B, the guide surface 236 of each guide portion 235 of the inertia mass body 23 (first plate member 231) is formed so that the outer ring 224 rolls on the guide surface 236 in accordance with the rotation of the second and third driven plates 17, 18 and thus, the shaft center A (the center of gravity of the weight body 22) of the first coupling shaft 221 swings with respect to (approaches and moves away from) the rotation center RC along the radial direction and swings around the virtual axis 24 while keeping the inter-axial distance L0 between the shaft center A and the virtual axis 24 constant (see the long dashed double short dashed line in FIG. 3). Thus, when the shaft center A of the first coupling shaft 221 swings around the virtual axis 24 while keeping the inter-axial distance L0 constant in accordance with the rotation of the second and third driven plates 17, 18, the inter-axial distance L1 between the center of gravity G of the weight body 22B and the virtual axis 24 serving as the swing center is increased as the swing angle θ (absolute value) is increased from the state in which the swing angle θ of the weight body 22B with respect to the inertia mass body 23 is zero, as shown in FIG. 15.

In this way, it is possible to obtain the vibration damping device 20 of the present disclosure even if the center of gravity adjusting weight 229 is fixed to the weight body 22 serving as a weight main body and the center of gravity G of the entirety of the weight body 22 and the center of gravity adjusting weight 229 (restoring force generation member) is moved radially inward on the center line CL, in the vibration damping device in which the center of gravity of the weight body 22 (the shaft center A of the first coupling shaft 221) swings around the virtual axis 24 while keeping the inter-axial distance L0 between the center of gravity and the virtual axis 24 (swing center) constant. Then, by applying the weight body 22B including the center of gravity adjusting weight 229 to the vibration damping device 20, it is possible to further improve the tunability of the vibration damping performance of the vibration damping device 20.

Further, as shown in FIG. 14 by a broken line, the center of gravity adjusting weight 229 may be fixed to each plate member 220 so that when the swing angle θ of the weight body 22 is zero, the center of gravity G of the weight body 22B, which serves as the restoring force generation member including the weight body 22B and the center of gravity adjusting weight 229, is positioned radially outward of the shaft center A (reference point) of the first coupling shaft 221 on the center line CL that includes the virtual axis 24, which serves as the swing center, and the rotation center RC. In this case, the center of gravity of the weight body 22 before the center of gravity adjusting weight 229 is fixed, that is, the shaft center A (reference point) of the first coupling shaft 221, is positioned radially inward of the center of gravity G of the weight body 22B on the center line CL when the swing angle θ of the weight body 22B is zero.

Figure 16:
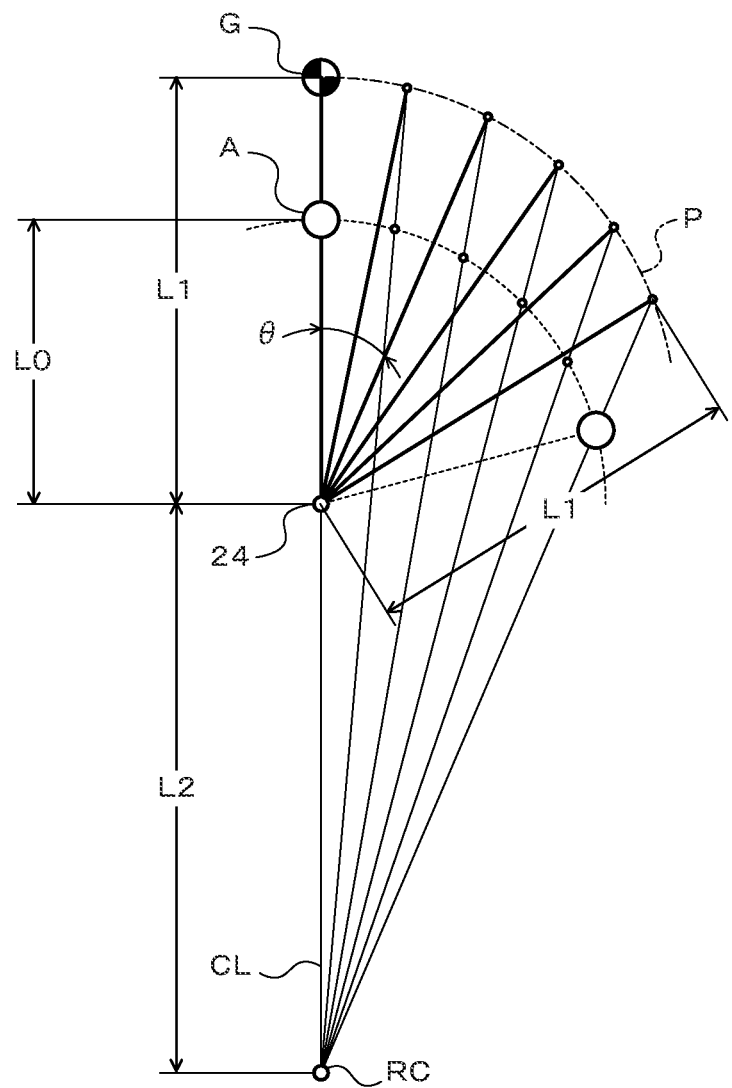
FIG. 16 is a schematic view for describing the configuration of the vibration damping device including the restoring force generation member in FIG. 14.

In the vibration damping device 20 including the weight body 22B, the inter-axial distance L1 between the center of gravity G of the weight body 22B and the virtual axis 24 is longer than an inter-axial distance L0 between the shaft center A of the first coupling shaft 221 (the center of gravity of the weight body 22 before the center of gravity adjusting weight 229 is fixed) and the virtual axis 24, when the swing angle θ of the weight body 22B with respect to the inertia mass body 23 is zero, as shown in FIG. 16. Further, when the shaft center A of the first coupling shaft 221 swings while keeping the virtual axis 24 while keeping the inter-axial distance L0 constant in accordance with the rotation of the second and third driven plates 17, 18, the inter-axial distance L1 between the center of gravity G of the weight body 22B and the virtual axis 24 serving as the swing center is increased as the swing angle θ (absolute value) is decreased from the state in which the swing angle θ of the weight body 22B with respect to the inertia mass body 23 is zero, as shown in FIG. 16.

In this way, the center of gravity adjusting weight 229 may be fixed to the weight body 22 serving as a weight main body and the center of gravity of the entirety of the weight body 22 and the center of gravity adjusting weight 229 (restoring force generation member) may be moved radially outward on the center line CL described above, in the vibration damping device in which the center of gravity G of the weight body 22 (the shaft center A of the first coupling shaft 221) swings around the virtual axis 24 while keeping the inter-axial distance (L0) between the center of gravity and the virtual axis 24 (swing center) constant. Thus, it is possible to obtain the vibration damping device 20 of the present disclosure and further improve the tunability of the vibration damping performance of the vibration damping device 20. The vibration damping device 20 of the present disclosure can be obtained, even when the center of gravity adjusting weight is not used, the reference point is set with respect to the weight body so as to be positioned radially outward or radially inward of the center of gravity G on the straight line including the virtual axis (swing center) and the rotation center RC when the swing angle θ is zero, and the trajectory of the reference point is set so that the reference point swings around the virtual axis while keeping the distance between the reference point and the virtual axis constant.

Figure 17:
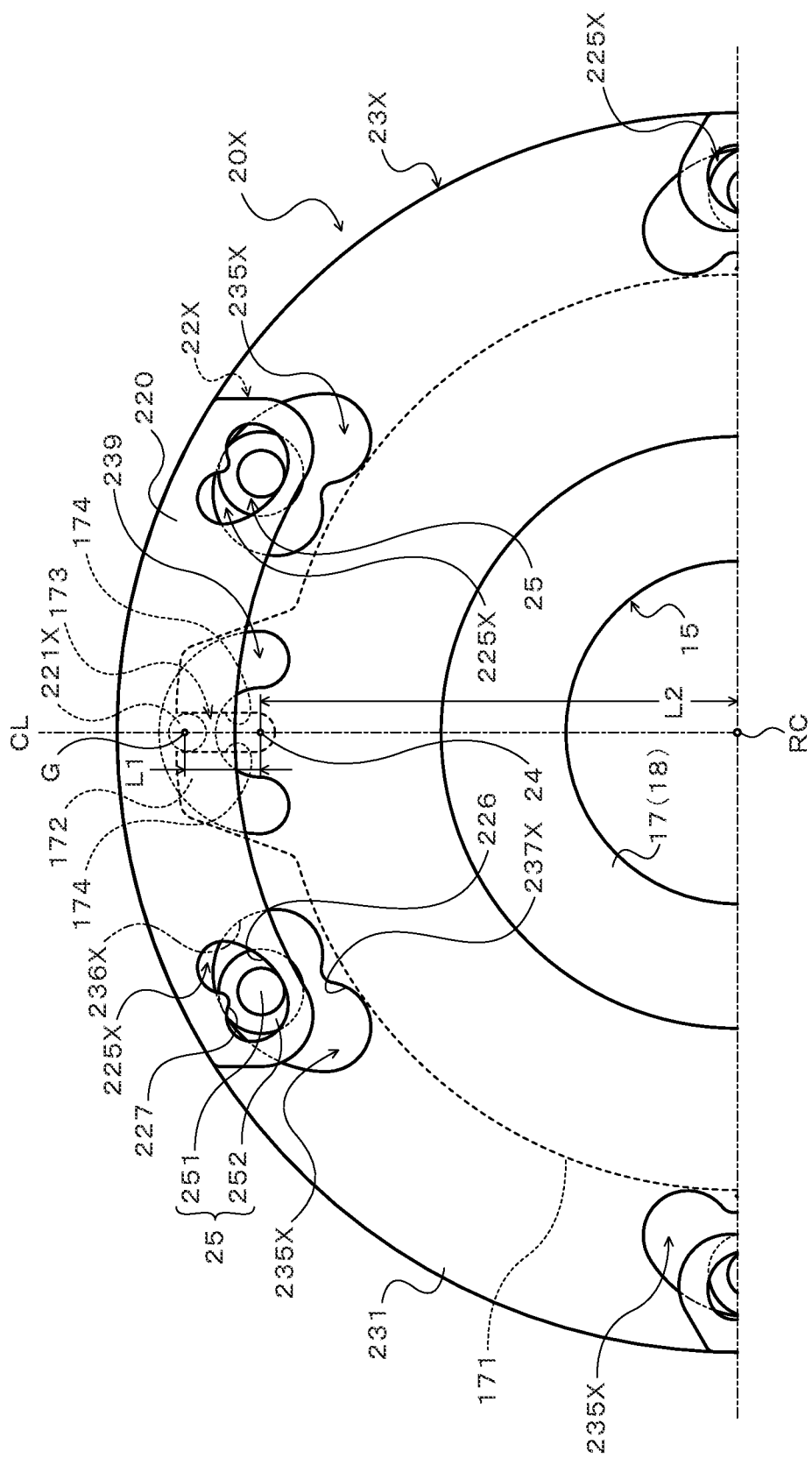
FIG. 17 is an enlarged view showing another vibration damping device of the present disclosure.

FIG. 17 is an enlarged view showing another vibration damping device 20X of the present disclosure. Among elements related to the vibration damping device 20X, the same elements as those of the vibration damping device 20 and the like described above are designated by the same reference numerals, and redundant description will be omitted.

The vibration damping device 20X is also connected to the driven member 15 of the damper device 10 and is disposed inside the fluid chamber 9 filled with working oil. As shown in FIG. 17, the vibration damping device 20X includes the second and third driven plates 17, 18 serving as supporting members (supporting plates), a plurality of (for example, three in the present embodiment) weight bodies 22X serving as restoring force generation members coupled to the second and third driven plates 17, 18 so as to transmit and receive torque to and from the second and third driven plates 17, 18, one annular inertia mass body 23X that is coupled to each weight body 22X, and a plurality of (for example, six in the present embodiment) coupling members 25.

Figure 18:
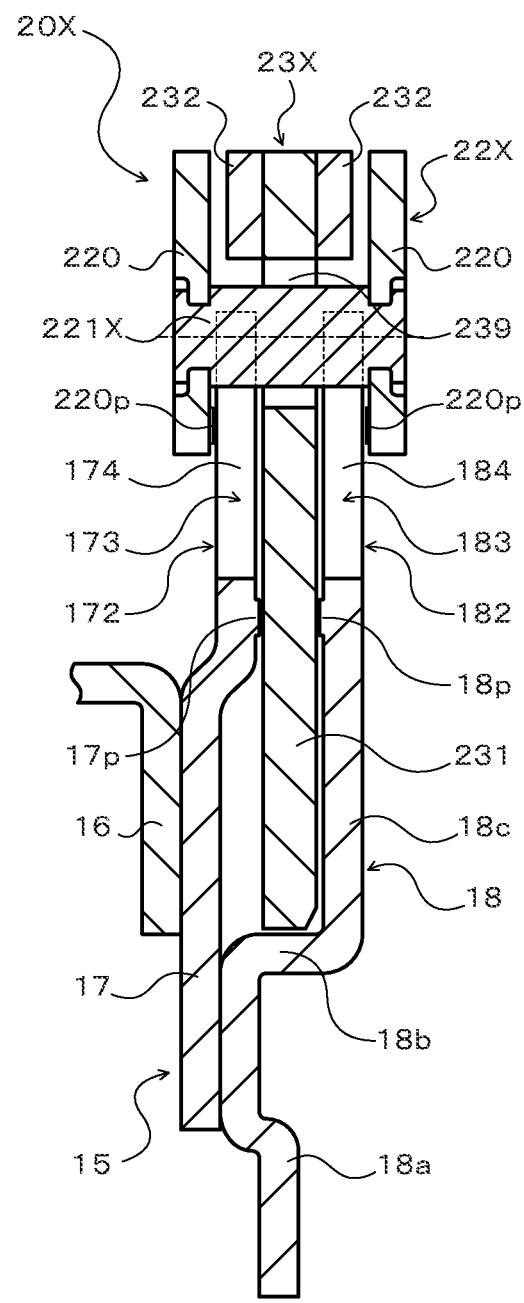
FIG. 18 is an enlarged cross-sectional view of a main part of another vibration damping device of the present disclosure.
Figure 19:
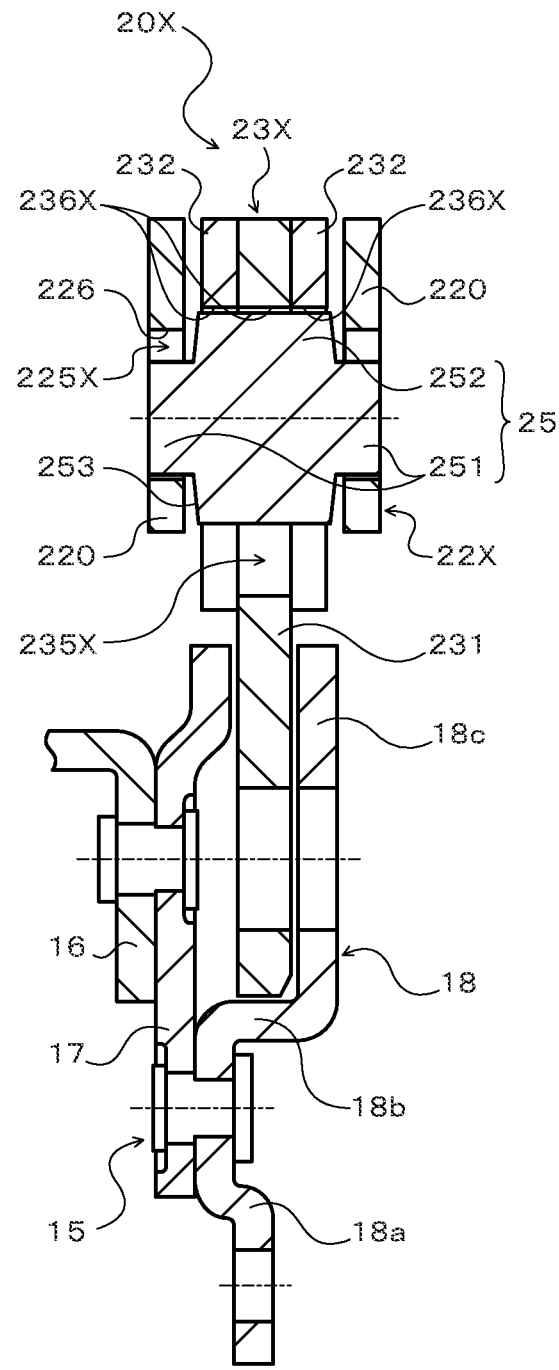
FIG. 19 is an enlarged cross-sectional view of a main part of another vibration damping device of the present disclosure.

As shown in FIGS. 18 and 19, each weight body 22X has two plate members (mass bodies) 220 having the same shape as each other, and one first coupling shaft 221X. Each plate member 220 is formed by a metal plate so as to have a symmetrical and arcuate planar shape, and the two plate members 220 are coupled to each other so as to face each other at an interval in the axial direction of the second and third driven plates 17, 18 via the first coupling shaft 221X. As shown in FIG. 17, each plate member 220 has an outer peripheral surface and an inner peripheral surface each formed by a cylindrical surface.

Further, each plate member 220 has two first guide portions 225X disposed so as to be arranged at intervals in the width direction (circumferential direction). With respect to the plate member 220, the two first guide portions 225X are formed symmetrically with respect to the center line CL in the width direction of the plate member 220 passing through the center of gravity of the weight body 22X. Each first guide portion 225X is an opening portion extending in a bow shape, and as shown in FIG. 17, includes a first guide surface 226 that has a concave spherical surface shape recessed toward the rotation center RC side of the second and third driven plates 17, 18 (driven member 15) on the inner peripheral side of the plate member 220, and a first supporting surface 227 that has a convex curved surface shape that is continuous with the first guide surface 226 and that faces the first guide surface 226 on the outer peripheral side of the plate member 220. However, the first guide surface 226 may be a concave curved surface that is recessed toward the opposite side of the rotation center RC, that is, toward the radial outer side, and the first supporting surface 227 may be a concave curved surface that faces the first guide surface 226.

The coupling shaft 221X is formed in the shape of a solid (or hollow) round bar, and as shown in FIG. 17, the coupling shaft 221X is fixed (coupled) to the two plate members 220 so that the shaft center of the coupling shaft 221 passes through the center of gravity G of the weight body 22X (plate member 220) on the center line CL (a straight line that passes through the rotation center RC of the second and third driven plates 17, 18 in the mounted state of the weight body 22X) in the width direction (circumferential direction) of the weight body 22X. The coupling shaft 221X has an outer diameter shorter than an interval between the pair of inner surfaces 174, 184 of the second and third driven plates 17, 18 (widths of the slits 173, 183) and a radial length of the inner surfaces 174, 184. The first coupling shaft 221X is slidably disposed in the slit 173 of each protruding portion 172 of the second driven plate 17 so as to be in contact with either one of the pair of inner surfaces 174, and is slidably disposed in the slit 183 of each of the protruding portions 182 of the third driven plate 18 so as to be in contact with either one of the pair of inner surfaces 184.

As a result, each weight body 22X is coupled to the second and third driven plates 17, 18 serving as supporting members so as to be movable in the radial direction, and form a sliding pair with the second and third driven plates 17, 18. Further, the coupling shaft 221X can come into contact with either one of the inner surfaces 174 of the corresponding slit 173 and the inner surfaces 184 of the corresponding slit 183 and thus, the first coupling shaft 221 functions as a torque transmission portion that transmits and receives torque to and from the second and third driven plates 17, 18. The coupling shaft 221X may rotatably support a cylindrical outer ring via a plurality of rollers or balls (rolling bodies), or may rotatably support the outer ring without interposing a rolling element.

As shown in FIGS. 18 and 19, the inertia mass body 23X includes one annular first plate member 231 formed of a metal plate and two annular second plate members 232 each formed of a metal plate. The weight of the inertia mass body 23X (first and second plate members 231, 232) is set to be sufficiently heavier than the weight of one weight body 22X. In the present embodiment, the curvature radius of an outer peripheral surface of the first plate member 231 and the curvature radius of an outer peripheral surface of each second plate member 232 are set to be the same. Further, as shown in FIG. 19, an inner peripheral surface of each second plate member 232 is formed to be positioned radially outward of an inner peripheral surface of the first plate member 231, when the second plate member 232 is disposed coaxially with the first plate member 231. Further, the thickness of each second plate member 232 is set to be less than the thickness of the second and third driven plates 17, 18 (protruding portions 172, 182).

Further, as shown in FIG. 17, the first plate members 231 has a plurality of (for example, six in the present embodiment) second guide portions 235X arranged at intervals in the circumferential direction so as to be in pairs in two by two. In the present embodiment, with respect to the first plate member 231, the two paired second guide portions 235X are formed to be symmetrical with respect to a straight line extending in the radial direction so as to divide the first plate member 231 into thirds around the center (a straight line that equally divides the first plate member 231 and the like into the number of weight bodies 22X). Each second guide portion 235X is an opening portion extending in a bow shape, and as shown in FIG. 17, includes a second guide surface 236X that has a concave spherical surface shape recessed toward the opposite side of the rotation center RC side, that is, toward the radial outer side, on the outer peripheral side of the first plate member 231, and a second supporting surface 237X that has a convex curved surface shape that is continuous with the second guide surface 236X and that faces the second guide surface 236X on the inner peripheral side of the first plate member 231. Further, in the present embodiment, as shown in FIG. 19, on the inner peripheral surface of the second plate member 232, a plurality of second guide surfaces 236X are formed at intervals in the circumferential direction so as to be continuous with the guide second surface 236X of each second guide portion 235X of the first plate member 231. When the first guide surface 226 is a re on the side opposite to the rotation center RC, that is, a concave curved surface shape recessed toward the opposite side of the rotation center RC, that is, toward the radial outer side, the second guide surface 236X may be a recessed curved surface recessed toward the opposite side of the first guide surface 226, that is, toward the rotation center RC side.

As shown in FIGS. 17 and 19, the coupling member 25 has two round bar-shaped first rolling portions (rollers) 251 and one second rolling portion (roller) 252 that are integrated with each other and that are extended coaxially. In the present embodiment, an outer diameter of the first rolling portion 251 is set to be smaller than an outer diameter of the second rolling portion 252, and the two first rolling portions 251 protrude outward in the axial direction from both ends of the second rolling portion 252. Further, an edge portion on the second rolling portion 252 side of the outer peripheral surface on an outer peripheral surface of each first rolling portion 251 is spaced away from an edge portion on the first rolling portion 251 side of an outer peripheral surface of the second rolling portion 252, and a tapered surface 253 that has a conical tapered shape is formed between the outer peripheral surface of each first rolling portion 251 and the outer peripheral surface of the second rolling portion 252. Each tapered surface 253 is inclined so as to become spaced away from the first rolling portion 251 having a small diameter and become closer to the second rolling portion 252 having a large diameter, from the inner peripheral side toward the outer peripheral side. The coupling member 25 may be formed to be solid as shown in the drawing or may be formed to be hollow. Further, the coupling member 25 may be a bar member or a pipe member forming the first rolling portion 251 fitted in a pipe material forming the second rolling portion 252. Further, depending on the configuration of the vibration damping device 20X, the outer diameters of the first and second rolling portions 251, 252 may be set to be the same, and the outer diameter of the first rolling portion 251 may be set to be larger than the outer diameter of the second rolling portion 252.

As shown in FIGS. 18 and 19, the second and third driven plates 17, 18 serving as supporting members are disposed in the axial direction between the two plate members 220 configuring the weight body 22X. Further, the second driven plate 17 and the annular portion 18*c* of the third driven plate 18 face each other at an interval in the axial direction as described above, and the first plate member 231 of the inertia mass body 23X is disposed between the second driven plate 17 and the annular portion 18*c* of the third driven plate 18 in the axial direction. The inner peripheral surface of the first plate member 231 is rotatably supported by the outer peripheral surface of the cylindrical portion 18*b* of the third driven plate 18. As a result, the inertia mass body 23X is rotatably supported with respect to the damper hub 7 by the driven member 15 so as to be rotatably supported around the rotation center RC by the second and third driven plates 17, 18 and thus forms a rotation pair with the second and third driven plates 17, 18. Then, each second plate member 232 of the inertia mass body 23X is fixed to the surface of the first plate member 231 via a fixing tool not shown so as to be disposed between the two plate members 220 of the weight body 22X and so as to be positioned on the corresponding one radial outer side of the second and third driven plates 17, 18 (protruding portions 172, 182).

Further, as shown in FIGS. 18 and 19, the two plate members 220 of the weight body 22X are coupled to each other by the coupling shaft 221X so as to sandwich the second and third driven plates 17, 18 (protruding portions 172, 182) and the inertia mass body 23X from both sides in the axial direction. As shown in FIGS. 18 and 19, on the first plate member 231 of the inertia mass body 23X, an opening portion 239 extending in an arc shape is formed, and the coupling shaft 221X of the weight body 22X is inserted in the opening portion 239. In the present embodiment, the inner surface of the opening portion 239 is formed so as not to come into contact with the coupling shaft 221X.

Further, as can be seen from FIG. 17, the first guide portion 225X of each plate member 220 of each weight body 22X and the second guide portion 235X of the first plate member 231 of the inertia mass body 23X are positioned between the second and third driven plates 17, 18 and the protruding portions 172, 182 in the circumferential direction. Further, each coupling member 25 is disposed in the corresponding first guide portion 225X of each plate member 220 and the corresponding second guide portion 235X of the first plate member 231. That is, each coupling member 25 is disposed between the first guide portion 225X of the corresponding weight body 22X and the second guide portion 235X of the inertia mass body 23X so that each first rolling portion 251 rolls on the corresponding first guide surface 226 and the second rolling portion 252 rolls on the corresponding second guide surface 236X and thus, each weight body 22X and the inertia mass body 23X are coupled.

Here, the first guide surface 226 of the first guide portion 225X of the weight body 22X and the second guide surface 236X of the second guide portion 235X of the inertia mass body 23X are formed so that the first rolling portion 251 of the coupling member 25 rolls on the first guide surface 226 and the second rolling portion 252 rolls on the second guide surface 236X in accordance with the rotation of the second and third driven plates 17, 18 and thus, the center of gravity G of the weight body 22X swings with respect to (approaches and moves away from) the rotation center RC of the second and third driven plates 17, 18 along the radial direction and swings around the virtual axis 24 that is set so that the relative position with respect to the inertia mass body 23X is constant while changing the inter-axial distance L1 between the virtual axis 24. The virtual axis 24 is a point on a straight line that divides the first plate member 231, etc. into thirds around the center and that extends in the radial direction (a straight line that equally divides the first plate member 231, etc. by the number of weight bodies 22X), and is a straight line orthogonal to the first plate member 231, etc. and passes through a point spaced away from the center (rotation center RC) of the first plate member 231, etc. by the predetermined fixed inter-axial distance L2.

As described above, in the vibration damping device 20X, each weight body 22X and the second and third driven plates 17, 18 form a sliding pair, and the second and third driven plates 17, 18 and the inertia mass body 23X form a rotating pair. Further, since the first rolling portion 251 of the coupling member 25 can roll the first guide surface 226 and the second rolling portion 252 can roll the second guide surface 236X, each weight body 22X and the inertia mass body 23X form a sliding pair. As a result, the second and third driven plates 17, 18, the plurality of weight bodies 22X, the inertia mass body 23X, and the coupling member 25 configure the slider crank mechanism (double slider crank chain). The equilibrium state of the vibration damping device 20X is a state in which the center of gravity G of each weight body 22X is positioned on a straight line passing through the corresponding virtual axis 24 and the rotation center RC (see FIG. 17).

Further, in the present embodiment, the plate member 220 of each weight body 22X and the inertia mass body 23X (first and second plate members 231, 232) are disposed so as to be offset in the axial direction of the second and third driven plates 17, 18 serving as supporting members and the second and third driven plates 17, 18 are disposed between the plate member 220 of each weight body 22X and the inertia mass body 23X. That is, the second driven plate 17 (protruding portion 172) is disposed between one plate member 220 of each weight body 22X and the first plate member 231 of the inertia mass body 23X in the axial direction, and the third driven plate 18 (protruding portion 182) is disposed between the other plate member 220 of each weight body 22X and the first plate member 231 of the inertia mass body 23X in the axial direction.

Further, as shown in FIG. 18, each plate member 220 of the weight body 22X is in contact with the surface of the protruding portion 172 of the second driven plate 17 or the surface of the protruding portion 182 of the third driven plate 18 and thus, at least one protrusion (dowel) $220p$ that restricts the axial movement of the plate member 220 with respect to the second and third driven plates 17, 18 is formed. As shown in FIG. 18, in the second driven plate 17, the plurality of protrusions (dowels) $17p$ that is in contact with one surface of the first plate member 231 of the inertia mass body 23X and that restricts axial movement of the inertia mass body 23X is formed at intervals in the circumferential direction. Further, as shown in FIG. 18, in the third driven plate 18, a plurality of protrusions (dowels) $18p$ that is in contact with the other surface of the first plate member 231 of the inertia mass body 23X and that restricts axial movement of the inertia mass body 23X is formed at intervals in the circumferential direction. However, in the second and third driven plates 17, 18, protrusions that are in sliding contact with each plate member 220 of the weight body 22X may be formed, and in the first plate member 231 of the inertia mass body 23X, protrusions that are in sliding contact with the second and third driven plates 17, 18, may be formed.

In the vibration damping device 20X configured as described above, when the second and third driven plates 17, 18 (driven member 15) rotate in one direction, each weight body 22X serving as a restoring force generation member swings (performs reciprocating motion) with respect to the rotation center RC along the radial direction of the second and third driven plates 17, 18 in the swinging range centered around the position in the equilibrium state that is set in accordance with the amplitude (vibration level) of the vibration transmitted from the engine EG to the driven member 15. Further, the component force of the centrifugal force acting on each weight body 22X is transmitted as a restoring force to the inertia mass body 23X via the first guide surface 226, the first and second rolling portions 251, 252 of the coupling member 25, and the second guide surface 236X, and the inertia mass body 23X swings (performs reciprocating rotary motion) in the opposite direction of the vibration of the second and third driven plates 17, 18 around the rotation center RC in the swinging range centered around the position in the equilibrium state that is set in accordance with the swinging range of each weight body 22X.

As a result, a torque (inertial torque) having a phase opposite to a fluctuating torque (vibration) transmitted from the engine EG to the drive member 11 from the swinging inertia mass body 23X can be applied to the second and third driven plates 17, 18 via the second guide surface 236X, the coupling member 25, the first guide surface 226, and the protruding portions 172, 182. As a result, by setting the specifications of the vibration damping device 20X so as to have an order in accordance with an order of vibration transmitted from the engine EG to the second and third driven plates 17, 18, it is possible to dampen the vibration transmitted from the engine EG to the driven member 15 (second and third driven plates 17, 18) by the vibration damping device 20X regardless of the rotation speed of the engine EG (second and third driven plates 17, 18).

Further, by coupling each weight body 22X and the inertia mass body 23X with the coupling member 25 that rolls on the first and second guide surfaces 226, 236X, compared to the case in which each weight body 22X is swingably supported in the radial direction by the driven member 15, it is possible to decrease the friction generated between the first guide surface 226 of the weight body 22X and the first rolling portion 251 of the coupling member 25 and between the second guide surface 236X of the inertia mass body 23 and the second rolling portion 252 of the coupling member 25, and it is also possible to further decrease the effect of the friction on the vibration damping performance. In addition, the degree of freedom of in which the shape can be changed is high in the coupling member 25 having the first and second rolling portions 251, 252, and by optimization of the shape of the coupling member 25 such as the formation of the tapered surface 253 as described above, it is possible to easily suppress the coupling member 25 and the nearby members from coming into contact. As a result, the vibration damping performance of the vibration damping device 20X can be further improved.

In the vibration damping device 20X, the rotation of the weight body 22X can be restricted by two sets of the first and second guide surfaces 226, 236X and the coupling member 25, and the decrease in the order of the vibration damping device 20X caused by the rotation of the weight body 22X can be suppressed. Further, it is possible to suppress damping of the centrifugal force (the component force thereof) acting on the weight body 22X used as the restoring force for swinging the inertia mass body 23 by smoothing swinging each weight body 22X with respect to the second and third driven plates 17, 18. In addition, by defining (constraining) the movement of the weight body 22X with two sets of the first and second guide surfaces 226, 236X and the coupling member 25 disposed symmetrically with respect to the center line CL, it is possible to decrease the frictional force generated between the coupling shaft 221X on the center line CL and the protruding portions 172, 182 of the second and third driven plates 17, 18 when torque is transmitted and received between the weight body 22X and the second and third driven plates 17, 18.

The vibration damping device 20X is also configured so that the inter-axial distance L1 between the center of gravity G of the weight body 22 and the virtual axis 24 serving as the swing center is changed as the swing angle θ of the weight body 22X with respect to the inertia mass body 23X is increased. As a result, by increasing and decreasing the inter-axial distance L1 between the center of gravity G of the weight body 22X when the swing angle θ is zero and the virtual axis 24 that is the swing center and by increasing and decreasing the moment of inertia of the inertia mass body 23X in accordance with the increase and decrease of the inter-axial distance L1, while suppressing the deviation of the order in accordance with the increase of the swing angle θ of the weight body 22X with respect to the inertia mass body 23X, it is possible to match the order of the vibration damping device 20X to the target order and it is also possible to adjust the torque (inertia torque) applied to the driven member 15 from the inertia mass body 23X.

That is, in the vibration damping device 20X, as shown in FIG. 12, by forming the first and second guide surfaces 226, 236X so that the inter-axial distance L1 gradually increases as the swing angle θ of the weight body 22X increases from the state in which the swing angle θ with respect to the inertia mass body 23X is zero, the torque (inertial torque) applied from the inertia mass body 23X to the driven member 15 can be increased, and the order of the vibration damping device 20X can be matched with the target order, while the deviation of the order corresponding to the increase in the swing angle θ can be suppressed. As a result, it is possible to satisfactorily dampen vibration of the target order while ensuring isochronism in the vibration damping device 20X and suppressing the increase of the moment of inertia of each weight body 22X.

Further, in the vibration damping device 20X, as shown in FIG. 13, the first and second guide surfaces 226, 236X may be formed so that the inter-axial distance L1 gradually decreases as the swing angle θ increases from the state in which the swing angle θ of the weight body 22X with respect to the inertia mass body 23X is zero. As a result, the order of the vibration damping device 20X can be matched with the target order while the deviation of the order in accordance with the increase of the swing angle θ is suppressed, and the torque (inertial torque) applied to the driven member 15 from the inertia mass body 23 can be decreased. As a result, it is possible to satisfactorily dampen vibration of the target order while ensuring isochronism in the vibration damping device 20X and suppressing the fluctuation of the moment of inertia of each weight body 22.

Further, the shapes of the first and second guide surfaces 226, 236X in the vibration damping device 20X can be determined as follows. That is, when determining the shapes of the first and second guide surfaces 226, 236X, after setting the trajectory P of the center of gravity G by analysis and the like so that the inter-axial distance L1 between the center of gravity G and the virtual axis 24 (swing center) is increased or decreased as the swing angle θ of the weight body 22X is increased, the center of gravity G of the weight body 22X is positioned on the center line CL, and then the two coupling members 25 (first and second rolling portions 251, 252) are disposed to be symmetrical with respect to the center line CL, and two straight lines passing through the shaft center of each coupling member 25 and the rotation center RC and a line segment connecting the shaft centers of the two coupling members 25 to each other are defined. Further, among intersections of a straight line, which passes through the shaft center of the coupling member 25 and the rotation center RC, and an outer periphery of the first rolling portion 251, the intersection closer to the rotation center RC is set as a first plot point of the first rolling portion 251, and among intersections of a straight line, which passes through the shaft center of the coupling member 25 and the rotation center RC, and an outer periphery of the second rolling portion 252, the intersection farther from the rotation center RC is set as a first plot point of the second rolling portion 252.

Subsequently, the center of gravity G of the weight body 22X is rotated for only a minute constant angle around the virtual axis 24 (shaft center) that is set beforehand along the trajectory P, and the straight line that passes through the relevant center of gravity G and the rotation center RC is defined. Further, the line segment connecting the shaft centers of the two coupling members 25 described above to each other is moved horizontally so that the center of the line segment intersects with the straight line passing through the center of gravity G after rotation and the rotation center RC. In this state, two straight lines passing through the shaft center of each coupling member 25 and the rotation center RC are defined, among the intersections of the straight line, which passes through the shaft center of the coupling member 25 and the rotation center RC, and the outer periphery of the first rolling portion 251, the intersection closer to the rotation center RC is set as a second plot point of the first rolling portion 251. Further, among the intersections of the straight line, which passes through the shaft center of the coupling member 25 and the rotation center RC, and the outer periphery of the second rolling portion 252, the intersection farther from the rotation center RC is set as a second plot point of the second rolling portion 252.

Thereafter, the process described above is repeatedly executed to obtain a plurality of plot points for each of the first rolling portion 251 and the second rolling portion 252. Then, by defining a smooth curve passing through the plurality of plot points of the first rolling portion 251, the first guide surface 226 of the first guide portion 225X is defined, and by defining a smooth curve passing through the plurality of plot points of the second rolling portion 252, the second guide surface 236X of the second guide portion 235X is defined. The shapes of the first supporting surface 227 of the first guide portion 225X and the second supporting surface 237X of the second guide portion 235X can be set arbitrarily in consideration of the outer diameters of the first rolling portion 251 and the second rolling portion 252.

Figure 20:
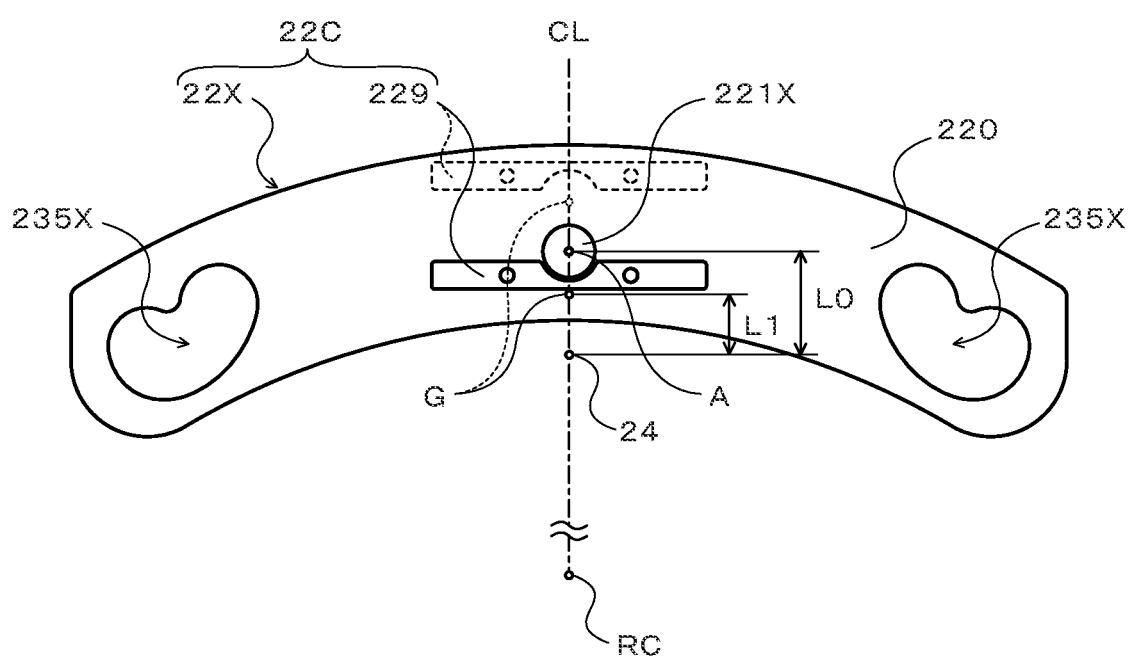
FIG. 20 is a front view showing another restoring force generation member that can be applied to another vibration damping device of the present disclosure.

Further, instead of the weight body 22X, a weight body 22C shown in FIG. 20 may be applied to the vibration damping device 20X as a restoring force generation member. The weight body 22C shown in FIG. 20 includes the weight body 22X serving as a weight main body and the center of gravity adjusting weight 229 fixed to the weight body 22X. Similar to the weight body described above, the weight body 22X includes the two plate members 220, and the coupling shaft 221X that is fixed (coupled) to the two plate member 220 so that the shaft center A serving as a reference point passes through the center of gravity of the weight body 22 on the center line CL in the width direction (circumferential direction) of the weight body 22X (plate member 220). When the swing angle θ of the weight body 22C with respect to the inertia mass body 23X is zero, the center of gravity adjusting weight 229 is fixed to each plate member 220 so that the center of gravity G of the weight body 22C, which serves as the restoring force generation member including the weight body 22X and the center of gravity adjusting weight 229, is positioned radially inward of the shaft center A (reference point) of the coupling shaft 221X on the center line CL that includes the virtual axis 24, which serves as the swing center, and the rotation center RC.

In the vibration damping device 20X including the weight body 22C, the inter-axial distance L1 between the center of gravity G of the weight body 22C and the virtual axis 24 is shorter than the inter-axial distance L0 between the shaft center A of the coupling shaft 221X (the center of gravity of the weight body 22X before the center of gravity adjusting weight 229 is fixed) and the virtual axis 24, when the swing angle θ of the weight body 22C with respect to the inertia mass body 23X is zero. Further, in the vibration damping device 20X including the weight body 22C, the first and second guide surfaces 226, 236X are formed so that the first rolling portion 251 of the coupling member 25 rolls on the first guide surface 226 and the second rolling portion 252 rolls on the second guide surface 236X in accordance with the rotation of the second and third driven plates 17, 18 and thus, the shaft center A (the center of gravity of the weight body 22X) of the coupling shaft 221X swings with respect to (approaches and moves away from) the rotation center RC along the radial direction and swings around the virtual axis 24 while keeping the inter-axial distance L0 between the shaft center A and the virtual axis 24 constant. Thus, when the shaft center A of the coupling shaft 221X swings around the virtual axis 24 while keeping the inter-axial distance L0 constant in accordance with the rotation of the second and third driven plates 17, 18, the inter-axial distance L1 between the center of gravity G of the weight body 22C and the virtual axis 24 serving as the swing center is increased as the swing angle θ (absolute value) is increased from the state in which the swing angle θ of the weight body 22C with respect to the inertia mass body 23X is zero.

In this way, it is possible to obtain the vibration damping device 20X of the present disclosure even if the center of gravity adjusting weight 229 is fixed to the weight body 22X serving as a weight main body and the center of gravity G of the entirety of the weight body 22X and the center of gravity adjusting weight 229 (restoring force generation member) is moved radially inward on the center line CL described above, in the vibration damping device in which the center of gravity of the weight body 22X (the shaft center A of the coupling shaft 221X) swings around the virtual axis 24 while keeping the inter-axial distance L0 between the center of gravity and the virtual axis 24 (swing center) constant. Further, as shown in FIG. 20 by a broken line, the center of gravity adjusting weight 229 may be fixed to each plate member 220 so that the center of gravity G of the weight body 22C, which serves as the restoring force generation member including the weight body 22 and the center of gravity adjusting weight 229, is positioned radially outward of the shaft center A (reference point) of the coupling shaft 221X on the center line CL that includes the virtual axis 24, which serves as the swing center, and the rotation center RC. Thus, it is possible to further improve the tunability of the vibration damping performance of the vibration damping device 20X.

Figure 21:
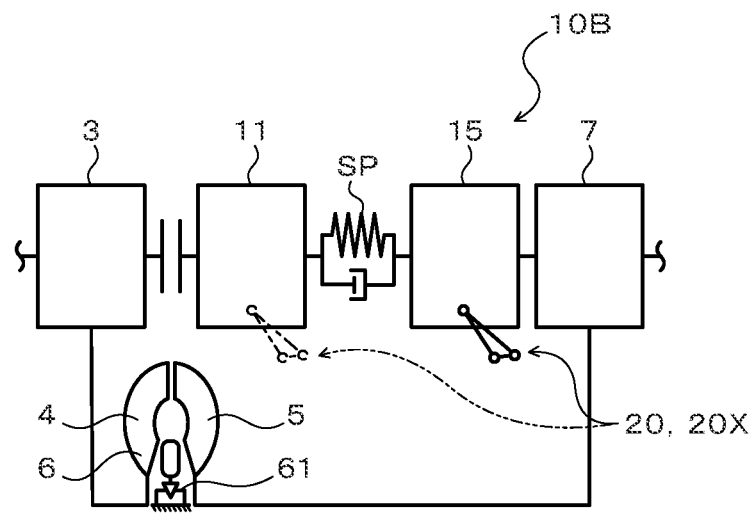
FIG. 21 is a schematic configuration diagram showing a modification of a damper device including the vibration damping device of the present disclosure.

The vibration damping devices 20, 20X may be coupled to the intermediate member 12 of the damper device 10 described above or may be coupled to the drive member (input element) 11 (see the long dashed double short dashed line in FIG. 1). Further, the vibration damping devices 20, 20X may be applied to a damper device 10B shown in FIG. 21. The damper device 10B of FIG. 21 corresponds to a damper device in which the intermediate member 12 is omitted from the damper device 10, includes the drive member (input element) 11 and the driven member 15 (output element) as rotation elements, and includes a spring SP that is disposed between the drive member 11 and the driven member 15 and that serves as a torque transmitting element. In this case, the vibration damping devices 20, 20X may be coupled to the driven member 15 of the damper device 10B as shown in the figure, or may be coupled to the drive member 11 as shown by the long dashed double short dashed line in the figure.

Figure 22:
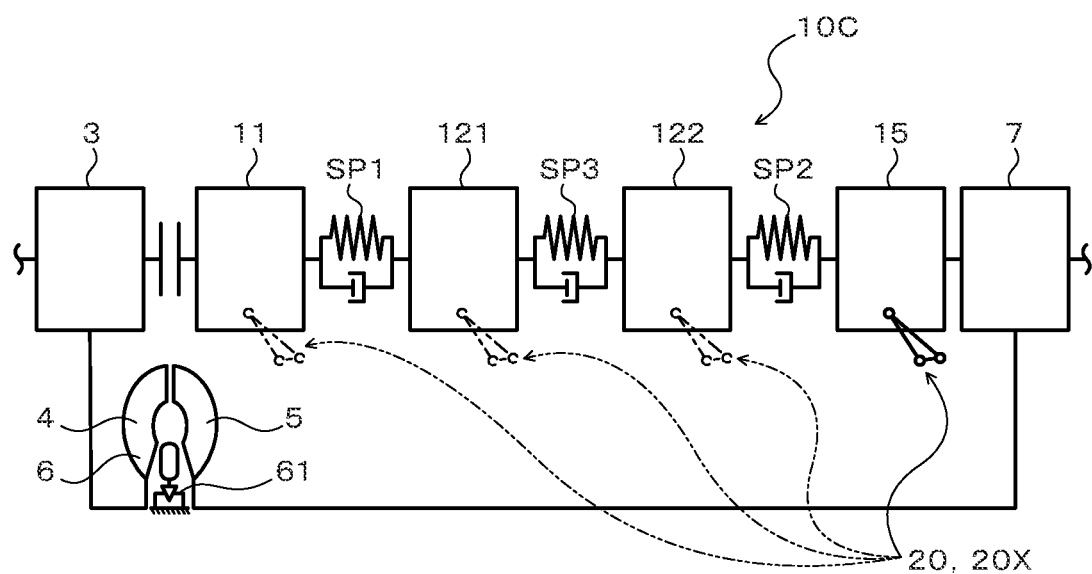
FIG. 22 is a schematic configuration diagram showing another modification of a damper device including the vibration damping device of the present disclosure.

Further, the vibration damping devices 20, 20X may be applied to a damper device 10C shown in FIG. 22. The damper device 10C of FIG. 22 includes, as rotation elements, the drive member (input element) 11, a first intermediate member (first intermediate element) 121, a second intermediate member (second intermediate element) 122, and the driven member (output element) 15. The damper device 10C also includes, as torque transmitting elements, the first spring SP1 that is disposed between the drive member 11 and the first intermediate member 121, the second spring SP2 that is disposed between the second intermediate member 122 and the driven member 15, and a third spring SP3 that is disposed between the first intermediate member 121 and the second intermediate member 122. In this case, the vibration damping devices 20, 20X may be coupled to the driven member 15 of the damper device 10C as shown in the figure, or may be coupled to the first intermediate member 121, the second intermediate member 122, or the drive member 11 as shown by the long dashed double short dashed line in the figure. In any case, by coupling the vibration damping devices 20, 20X to the rotation elements of the damper devices 10, 10B, 10C, the vibration can be dampened extremely well by both the damper devices 10, 10B, 10C and the vibration damping devices 20, 20X.

As described above, a vibration damping device of the present disclosure is a vibration damping device (20, 20X) including: a supporting member (17, 18) that rotates integrally with a rotation element (11, 12, 121, 122, 15), to which torque from an engine (EG) is transmitted, around a rotation center (RC) of the rotation element (11, 12, 121, 122, 15); a restoring force generation member (22, 22B, 22X, 22C) that is coupled to the supporting member (17, 18) so as to transmit and receive torque to and from the supporting member (17, 18) and that is configured to swing in accordance with rotation of the supporting member (17, 18); and an inertia mass body (23, 23X) that is coupled to the supporting member (17, 18) via the restoring force generation member (22, 22B, 22X, 22C) and that swings around the rotation center (RC) in conjunction with the restoring force generation member (22, 22B, 22X, 22C) in accordance with rotation of the supporting member (17, 18), in which the restoring force generation member (22, 22B, 22X, 22C) swings around a swing center (24) that is set so that a relative position with respect to the inertia mass body (23, 23X) does not change, in which a distance (L1) between a center of gravity (G) of the restoring force generation member (22, 22B, 22X, 22C) and the swing center (24) changes in accordance with a change in a swing angle (θ) of the restoring force generation member (22, 22B, 22X, 22C) with respect to the inertia mass body (23, 23X).

The present inventors carried out intensive research to further improve the vibration damping performance of the vibration damping device including the restoring force generation member that swings in the radial direction in accordance with the rotation of the supporting member and the inertia mass body that swings around the rotation center in conjunction with the restoring force generation member, and focused on the relationship between the distance L1 between the center of gravity of the restoring force generation member and the swing center of the restoring force generation member and the distance L2 between the swing center and the rotation center of the supporting member. Then, the present inventors have found that this type of vibration damping device has the following characteristics (1) to (6).

(1) In a case in which the sum of the distances L1, L2 (L1+L2) is constant and the values of the distances L1, L2 in which isochronism is satisfactorily ensured in the vibration damping device are each set to one value, when the distance L1 is decreased while the sum of the distances L1, L2 is kept constant, the order of the vibration damping device when the vibration angle θ of the restoring force generation member with respect to the inertia mass body is zero (the order of the vibration that is satisfactorily damped by the vibration damping device) is increased, and the order of the vibration damping device is increased as the vibration angle is increased (isochronism is impaired).

(2) In a case in which the sum of the distances L1, L2 (L1+L2) is constant and the values of the distances L1, L2 in which isochronism is satisfactorily ensured in the vibration damping device are each set to one value, when the distance L1 is increased while the sum of the distances L1, L2 is kept constant, the order of the vibration damping device when the vibration angle described above is zero is decreased, and the order of the vibration damping device is decreased as the vibration angle is increased (isochronism is impaired).

(3) When the distance L1 is decreased while the sum of the distances L1, L2 is kept constant, by increasing the moment of inertia of the inertia mass body, the order of the vibration damping device when the swing angle of the restoring force generation member with respect to the inertia mass body is zero is decreased.

(4) When the distance L1 is increased while the sum of the distances L1, L2 is kept constant, by decreasing the moment of inertia of the inertia mass body, the order of the vibration damping device when the swing angle of the restoring force generation member with respect to the inertia mass body is zero is increased.

(5) In a case in which the distance L1 is decreased while the sum of the distances L1, L2 is kept constant, when the distance L1 is gradually increased as the swing angle (absolute value) is increased from the state in which the swing angle of the restoring force generation member with respect to the inertia mass body is zero, the deviation of the order of the vibration damping device in accordance with the increase in the swing angle is suppressed so that isochronism can be ensured.

(6) In a case in which the distance L1 is increased while the sum of the distances L1, L2 is kept constant, when the distance L1 is gradually decreased as the swing angle (absolute value) is increased from the state in which the swing angle of the restoring force generation member with respect to the inertia mass body is zero, the deviation of the order of the vibration damping device in accordance with the increase in the swing angle is suppressed so that isochronism can be ensured.

Based on the findings (1) to (6) described above, the vibration damping device of the present disclosure is configured so that the distance between the center of gravity of the restoring force generation member and the swing center, which is set so that the relative position with respect to the inertia mass body does not change, changes. As a result, by increasing and decreasing the distance L1 between the center of gravity of the restoring force generation member when the swing angle is zero and the swing center and by increasing and decreasing the moment of inertia of the inertia mass body in accordance with the increase and decrease of the distance L1, while suppressing the deviation of the order in accordance with the increase of the swing angle of restoring force generation member with respect to the inertia mass body, it is possible to match the order of the vibration damping device to the target order, and it is also possible to adjust the torque (inertia torque) applied to the supporting member from the inertia mass body. As a result, it is possible to satisfactorily dampen vibration of the target order while ensuring isochronism in the vibration damping device.

Further, the distance (L1) between the center of gravity (G) of the restoring force generation member (22, 22B, 22X, 22C) and the swing center (24) may be increased as the swing angle (θ) of the restoring force generation member (22, 22B, 22X, 22C) is increased. As a result, by decreasing the distance L1 between the center of gravity of the restoring force generation member when the swing angle is zero and the swing center and by increasing the moment of inertia of the inertia mass body in accordance with the decrease of the distance L1, while suppressing the deviation of the order in accordance with the increase of the swing angle of restoring force generation member with respect to the inertia mass body, it is possible to match the order of the vibration damping device to the target order, and it is also possible to increase the torque (inertia torque) applied to the supporting member from the inertia mass body. As a result, it is possible to satisfactorily dampen vibration of the target order while ensuring isochronism in the vibration damping device.

Further, the restoring force generation member (22B, 22C) may include a reference point (A) that is set to be positioned radially outward of the center of gravity (G) on a straight line (CL) including the swing center (24) and the rotation center (RC) when the swing angle (θ) is zero, and the reference point (A) of the restoring force generation member (22B, 22C) may swing around the swing center (24) while keeping a distance (L0) from the swing center (24) constant. This makes it possible to increase the distance between the center of gravity of the restoring force generation member and the swing center as the swing angle of the restoring force generation member is increased.

Further, the restoring force generation member (22B, 22C) may include a weight main body (22, 22X) and a center of gravity adjusting weight (229) that is fixed to the weight main body (22, 22X), and a center of gravity of the weight main body (22, 22X) may match the reference point (A), and the center of gravity adjusting weight (229) may be fixed to the weight main body (22, 22X) so that the center of gravity (G) of the restoring force generation member (22B, 22C) may is positioned radially inward of the reference point (A) on the straight line (CL) when the swing angle (θ) is zero. As a result, the center of gravity of the restoring force generation member including the weight main body and the center of gravity adjusting weight can be positioned radially inward of the reference point on the straight line, and the distance between the center of gravity of the restoring force generation member and the swing center can be increased as the swing angle is increased. That is, when the center of gravity of the weight main body swings around the swing center while the distance between the center of gravity and the swing center is kept constant, by fixing the center of gravity adjusting weight to the weight main body and moving the center of the restoring force generation member, which includes the weight main body and the center of gravity adjusting weight, radially inward on the straight line described above, it is possible to obtain the vibration damping device of the present disclosure.

Further, the distance (L1) between the center of gravity (G) of the restoring force generation member (22, 22B, 22X, 22C) and the swing center (24) may be decreased as the swing angle (θ) of the restoring force generation member (22, 22B, 22X, 22C) is increased. As a result, by increasing the distance L1 between the center of gravity of the restoring force generation member when the swing angle is zero and the swing center and by decreasing the moment of inertia of the inertia mass body in accordance with the increase of the distance L1, while suppressing the deviation of the order in accordance with the increase of the swing angle of restoring force generation member with respect to the inertia mass body, it is possible to match the order of the vibration damping device to the target order, and it is also possible to decrease the torque (inertia torque) applied to the supporting member from the inertia mass body. As a result, it is possible to satisfactorily dampen vibration of the target order while ensuring isochronism in the vibration damping device and suppressing the fluctuation of the moment of inertia of the restoring force generation member.

Further, the restoring force generation member (22B, 22C) may include a reference point (A) that is set to be positioned radially inward of the center of gravity (G) on a straight line (CL) including the swing center (24) and the rotation center (RC) when the swing angle (θ) is zero, and the reference point (A) of the restoring force generation member (22B, 22C) may swing around the swing center (24) while keeping a distance (L0) from the swing center (24) constant. This makes it possible to decrease the distance between the center of gravity of the restoring force generation member and the swing center as the swing angle of the restoring force generation member is increased.

Further, the restoring force generation member (22B, 22C) may include a weight main body (22, 22X) and a center of gravity adjusting weight (229) that is fixed to the weight main body (22, 22X), and a center of gravity of the weight main body (22, 22X) may match the reference point (A), and the center of gravity adjusting weight (229) may be fixed to the weight main body (22, 22X) so that the center of gravity (G) of the restoring force generation member (22B, 22C) may be positioned radially outward of the reference point (A) on the straight line (CL) when the swing angle (θ) is zero. As a result, the center of gravity of the restoring force generation member including the weight main body and the center of gravity adjusting weight can be positioned radially outward of the reference point on the straight line, and the distance between the center of gravity of the restoring force generation member and the swing center can be decreased as the swing angle is increased. That is, when the center of gravity of the weight main body swings around the swing center while the distance between the center of gravity and the swing center is kept constant, even when the center of gravity adjusting weight is fixed to the weight main body and the center of the restoring force generation member, which includes the weight main body and the center of gravity adjusting weight, is moved radially outward on the straight line described above, it is possible to obtain the vibration damping device of the present disclosure.

The vibration damping device (20) may include: a guided portion (225) that is provided on one of the restoring force generation member (22, 22B) and the inertia mass body (23); and a guide portion (235) that is formed on the other one of the restoring force generation member (22, 22B) and the inertia mass body (23), and that guides the guided portion (225) so that when the supporting member (17, 18) rotates, the restoring force generation member (22, 22B) swings around the swing center (24) and swings along a radial direction of the supporting member (17, 18) and so that the inertia mass body (23) swings around the rotation center (RC), and to which a component force of a centrifugal force acting on the restoring force generation member (22, 22B) is transmitted from the guided portion (225).

The vibration damping device (20X), may include: a first guide surface (226) provided on the restoring force generation member (22X, 22C); a second guide surface (236X) provided on the inertia mass body (23X); and a coupling member (25) that has a first rolling portion (251) and a second rolling portion (252) integrated with each other, and that is disposed so that the first rolling portion (251) rolls on the first guide surface (226) and the second rolling portion (252) rolls on the second guide surface (236X), in which the first and second guide surfaces (226, 236X) are formed so that, by having the first rolling portion (251) roll on the first guide surface (226) and the second rolling portion (252) roll on the second guide surface (236X) in accordance with rotation of the supporting member (17, 18), the restoring force generation member (22X, 22C) swings around the swing center (24) and swings along the radial direction of the supporting member (17, 18) with respect to the rotation center (RC) and so that the inertia mass body (23X) swings around the rotation center (RC), and when the supporting member (17, 18) rotates, a component force of a centrifugal force acting on the restoring force generation member (22X, 22C) is transmitted from the first guide surface (226) to the second guide surface (236X) via the coupling member (25).

Further, the supporting member (17, 18) may rotate coaxially and integrally with any rotation element of a damper device (10, 10B, 10C) having a plurality of rotation elements at least including an input element (11) and an output element (15), and an elastic body (SP, SP1, SP2, SP3) that transmits torque between the input element (11) and the output element (15). By coupling the vibration damping device to the rotation element of the damper device in this way, it is possible to dampen the vibration extremely well with both the damper device and the vibration damping device.

Further, the output element (15) of the damper device (10, 10B, 10C) may be operatively coupled to an input shaft (IS) of a transmission (TM).

A designing method of a vibration damping device of the present disclosure is a designing method of a vibration damping device (20, 20X) including: a supporting member (17, 18) that rotates integrally with a rotation element (11, 12, 121, 122, 15), to which torque from an engine (EG) is transmitted, around a rotation center (RC) of the rotation element (11, 12, 121, 122, 15); a restoring force generation member (22, 22B, 22X, 22C) that is coupled to the supporting member (17, 18) so as to transmit and receive torque to and from the supporting member (17, 18) and that is configured to swing in accordance with rotation of the supporting member (17, 18); and an inertia mass body (23, 23X) that is coupled to the supporting member (17, 18) via the restoring force generation member (22, 22B, 22X, 22C) and that swings around the rotation center (RC) in conjunction with the restoring force generation member (22, 22B, 22X, 22C) in accordance with rotation of the supporting member (17, 18), in which the restoring force generation member (22, 22B, 22X, 22C) swings around a swing center (24) that is set so that a relative position with respect to the inertia mass body (23, 23X) does not change, in which a trajectory of a center of gravity (G) of the restoring force generation member (22, 22B, 22X, 22C) is set so that a distance (L1) between the center of gravity (G) and the swing center (24) changes in accordance with a change in a swing angle (θ) of the restoring force generation member (22, 22B, 22X, 22C) with respect to the inertia mass body (23, 23X).

With such a method, it is possible to satisfactorily dampen vibration of the target order while ensuring isochronism in the vibration damping device.

Further, a trajectory of the center of gravity (G) of the restoring force generation member (22, 22B, 22X, 22C) may be set so that as the swing angle (θ) of the restoring force generation member (22, 22B, 22X, 22C) is increased, the distance (L1) between the center of gravity (G) and the swing center (24) is increased.

Further, with respect to the restoring force generation member (22B, 22C), a reference point (A) that is positioned radially outward of the center of gravity (G) on a straight line (CL) including the swing center (24) and the rotation center (RC) when the swing angle (θ) is zero may be set, and a trajectory of the reference point (A) of the restoring force generation member (22B, 22C) may be set so that the reference point (A) swings around the swing center (24) while keeping a distance (L0) from the swing center (24) constant.

Further, the restoring force generation member (22B, 22C) may include a weight main body (22, 22X) and a center of gravity adjusting weight (229) that is fixed to the weight main body (22, 22X), and the center of gravity of the weight main body (22, 22X) may be matched with the reference point (A), and a center of gravity adjusting weight (229) may be fixed to the weight main body (22, 22X) so that the center of gravity (G) of the restoring force generation member (22B, 22C) is positioned radially inward of the reference point (A) on the straight line (CL) when the swing angle (θ) is zero.

Further, the trajectory of the center of gravity of the restoring force generation member (22, 22B, 22X, 22C) may be set so that the distance (L1) between the center of gravity (G) and the swing center (24) is decreased as the swing angle (θ) of the restoring force generation member (22, 22B, 22X, 22C) is increased.

Further, with respect to the restoring force generation member (22B, 22C), a reference point (A) that is positioned radially inward of the center of gravity (G) on a straight line (CL) including the swing center (24) and the rotation center (RC) when the swing angle (θ) is zero may be set, and a trajectory of the reference point (A) of the restoring force generation member (22B, 22C) may be set so that the reference point (A) swings around the swing center (24) while keeping a distance (L0) from the swing center (24) constant.

Further, the restoring force generation member (22B, 22C) may include a weight main body (22, 22X) and a center of gravity adjusting weight (229) that is fixed to the weight main body (22, 22X), and the center of gravity of the weight main body (22, 22X) may be matched with the reference point (A), and a center of gravity adjusting weight (229) may be fixed to the weight main body (22, 22X) so that the center of gravity (G) of the restoring force generation member (22B, 22C) is positioned radially outward of the reference point (A) on the straight line (CL) when the swing angle (θ) is zero.

Further, it goes without saying that the invention of the present disclosure is not limited to the embodiments described above, and various modifications can be made within the scope of the extension of the present disclosure. Furthermore, the form for carrying out the various aspects described above is merely one specific form of the aspects described in the SUMMARY OF THE DISCLOSURE, and does not limit the elements of the aspects described in the SUMMARY OF THE DISCLOSURE.

INDUSTRIAL APPLICABILITY

Aspects of the present disclosure can be used in a manufacturing field of a vibration damping device that dampens vibration of a rotation element.

The invention claimed is:

1. A vibration damping device comprising:
   a supporting member that rotates integrally with a rotation element, to which torque from an engine is transmitted, around a rotation center of the rotation element;
   a restoring force generation member that is coupled to the supporting member so as to transmit and receive torque to and from the supporting member and that is configured to swing about a swing center offset from the rotation center of the rotation element in accordance with rotation of the supporting member; and
   an inertia mass body that is coupled to the supporting member via the restoring force generation member and that swings around the rotation center in conjunction with the restoring force generation member in accordance with rotation of the supporting member, wherein
   the restoring force generation member swings around the swing center that is set so that a relative position of the swing center with respect to the inertia mass body does not change, and
   a distance between a center of gravity of the restoring force generation member and the swing center changes in accordance with a change in a swing angle of the restoring force generation member with respect to the inertia mass body.

2. The vibration damping device according to claim 1, wherein the distance between the center of gravity of the restoring force generation member and the swing center is increased as the swing angle of the restoring force generation member is increased.

3. The vibration damping device according to claim 2, wherein
the restoring force generation member includes a reference point that is set to be positioned radially outward of the center of gravity on a straight line including the swing center and the rotation center when the swing angle is zero, and
the reference point of the restoring force generation member swings around the swing center while keeping a distance from the swing center constant.

4. The vibration damping device according to claim 3, wherein
the restoring force generation member includes a weight main body and a center of gravity adjusting weight that is fixed to the weight main body, and
a center of gravity of the weight main body matches the reference point, and the center of gravity adjusting weight is fixed to the weight main body so that the center of gravity of the restoring force generation member is positioned radially inward of the reference point on the straight line when the swing angle is zero.

5. The vibration damping device according to claim 1, wherein the distance between the center of gravity of the restoring force generation member and the swing center is decreased as the swing angle of the restoring force generation member is increased.

6. The vibration damping device according to claim 5, wherein
the restoring force generation member includes a reference point that is set to be positioned radially inward of the center of gravity on a straight line including the swing center and the rotation center when the swing angle is zero, and
the reference point of the restoring force generation member swings around the swing center while keeping a distance from the swing center constant.

7. The vibration damping device according to claim 6, wherein
the restoring force generation member includes a weight main body and a center of gravity adjusting weight that is fixed to the weight main body, and
a center of gravity of the weight main body matches the reference point, and the center of gravity adjusting weight is fixed to the weight main body so that the center of gravity of the restoring force generation member is positioned radially outward of the reference point on the straight line when the swing angle is zero.

8. The vibration damping device according to claim 1, the vibration damping device further comprising:
a guided portion that is provided on one of the restoring force generation member and the inertia mass body; and
a guide portion that is formed on the other one of the restoring force generation member and the inertia mass body, and that guides the guided portion so that when the supporting member rotates, the restoring force generation member swings around the swing center and swings along a radial direction of the supporting member and so that the inertia mass body swings around the rotation center, and to which a component force of a centrifugal force acting on the restoring force generation member is transmitted from the guided portion.

9. The vibration damping device according to claim 1, the vibration damping device further comprising:
a first guide surface provided on the restoring force generation member;
a second guide surface provided on the inertia mass body; and
a coupling member that has a first rolling portion and a second rolling portion integrated with each other, and that is disposed so that the first rolling portion rolls on the first guide surface and the second rolling portion rolls on the second guide surface, wherein
the first and second guide surfaces are formed so that, by having the first rolling portion roll on the first guide surface and the second rolling portion roll on the second guide surface in accordance with rotation of the supporting member, the restoring force generation member swings around the swing center and swings along the radial direction of the supporting member with respect to the rotation center and so that the inertia mass body swings around the rotation center, and
when the supporting member rotates, a component force of a centrifugal force acting on the restoring force generation member is transmitted from the first guide surface to the second guide surface via the coupling member.

10. The vibration damping device according to claim 1, wherein
the supporting member rotates coaxially and integrally with any rotation element of a damper device having a plurality of rotation elements at least including an input element and an output element, and an elastic body that transmits torque between the input element and the output element.

11. The vibration damping device according to claim 10, wherein the output element of the damper device is a vibration damping device that is operatively coupled to an input shaft of a transmission.

12. A designing method of a vibration damping device comprising:
a supporting member that rotates integrally with a rotation element, to which torque from an engine is transmitted, around a rotation center of the rotation element;
a restoring force generation member that is coupled to the supporting member so as to transmit and receive torque to and from the supporting member and that is configured to swing about a swing center offset from the rotation center of the rotation element in accordance with rotation of the supporting member; and
an inertia mass body that is coupled to the supporting member via the restoring force generation member and that swings around the rotation center in conjunction with the restoring force generation member in accordance with rotation of the supporting member, in which the restoring force generation member swings around the swing center that is set so that a relative position of the swing center with respect to the inertia mass body does not change, wherein
a trajectory of a center of gravity of the restoring force generation member is set so that a distance between the center of gravity and the swing center changes in accordance with a change in a swing angle of the restoring force generation member with respect to the inertia mass body.

13. The designing method of a vibration damping device according to claim 12, wherein the trajectory of the center of gravity of the restoring force generation member is set so that the distance between the center of gravity and the swing center is increased as the swing angle of the restoring force generation member is increased.

14. The designing method of a vibration damping device according to claim 13, wherein
with respect to the restoring force generation member, a reference point that is positioned radially outward of the center of gravity on a straight line including the swing center and the rotation center when the swing angle is zero is set, and
a trajectory of the reference point of the restoring force generation member is set so that the reference point swings around the swing center while keeping a distance from the swing center constant.

15. The designing method of a vibration damping device according to claim 14, wherein
the restoring force generation member includes a weight main body and a center of gravity adjusting weight that is fixed to the weight main body, and
a center of gravity of the weight main body is matched with the reference point, and the center of gravity adjusting weight is fixed to the weight main body so that the center of gravity of the restoring force generation member is positioned radially inward of the reference point on the straight line when the swing angle is zero.

16. The designing method of a vibration damping device according to claim 12, wherein
the trajectory of the center of gravity of the restoring force generation member is set so that the distance between the center of gravity and the swing center is decreased as the swing angle of the restoring force generation member is increased.

17. The designing method of a vibration damping device according to claim 16, wherein
with respect to the restoring force generation member, a reference point positioned radially inward of the center of gravity on a straight line including the swing center and the rotation center when the swing angle is zero is set, and
a trajectory of the reference point of the restoring force generation member is set so that the reference point swings around the swing center while keeping a distance from the swing center constant.

18. The designing method of a vibration damping device according to claim 17, wherein
the restoring force generation member includes a weight main body and a center of gravity adjusting weight that is fixed to the weight main body, and
a center of gravity of the weight main body is matched with the reference point, and the center of gravity adjusting weight is fixed to the weight main body so that the center of gravity of the restoring force generation member is positioned radially outward of the reference point on the straight line when the swing angle is zero.

* * * * *